United States Patent
Li et al.

(10) Patent No.: US 12,113,750 B2
(45) Date of Patent: Oct. 8, 2024

(54) METHOD FOR DEACTIVATING CARRIER OR ACTIVATING CARRIER AND APPARATUS

(71) Applicant: Huawei Technologies Co., Ltd., Shenzhen (CN)

(72) Inventors: Xinxian Li, Shanghai (CN); Hao Tang, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 914 days.

(21) Appl. No.: 17/171,720

(22) Filed: Feb. 9, 2021

(65) Prior Publication Data

US 2021/0167935 A1    Jun. 3, 2021

Related U.S. Application Data

(63) Continuation of application No. PCT/CN2019/089826, filed on Jun. 3, 2019.

(30) Foreign Application Priority Data

Aug. 10, 2018  (CN) .......................... 201810908393.4

(51) Int. Cl.
*H04L 5/00* (2006.01)
*H04L 1/1812* (2023.01)
(Continued)

(52) U.S. Cl.
CPC .......... *H04L 5/0098* (2013.01); *H04L 1/1812* (2013.01); *H04W 72/0453* (2013.01); *H04W 72/21* (2023.01); *H04W 72/23* (2023.01)

(58) Field of Classification Search
CPC . H04L 27/2607; H04L 5/0092; H04L 5/0098; H04L 5/0094; H04L 5/0051;
(Continued)

(56) References Cited

U.S. PATENT DOCUMENTS 10,666,480 B2 * 5/2020 Babaei .............. H04W 72/1268
10,687,339 B2 * 6/2020 Babaei .................. H04W 72/23
(Continued)

FOREIGN PATENT DOCUMENTS

CN       102131275 A       7/2011
CN       107534895 A       1/2018
(Continued)

OTHER PUBLICATIONS

3rd Generation Partnership Project; Technical Specification Group Radio Access Network; NR; Medium Access Control (MAC) protocol specification (Release 15), 3GPP TS 38.321 V15.0.0 (Dec. 2017), 55 pages.
(Continued)

*Primary Examiner* — Jung Liu
(74) *Attorney, Agent, or Firm* — Slater Matsil, LLP

(57) ABSTRACT

This application provides a method for deactivating a carrier and an apparatus. The method includes: A terminal receives first information, where the first information indicates a default bandwidth part (BWP). The terminal deactivates a secondary carrier based on the default BWP. According to the provided embodiments, the secondary carrier is deactivated by using physical layer control information for activating or deactivating a BWP.

21 Claims, 14 Drawing Sheets

A terminal receives first information, where the first information indicates a default bandwidth part (BWP) — 300

The terminal deactivates a secondary carrier based on the default BWP — 310

(51) Int. Cl.
*H04W 72/0453* (2023.01)
*H04W 72/21* (2023.01)
*H04W 72/23* (2023.01)

(58) Field of Classification Search
CPC ... H04L 5/0055; H04L 5/001; H04L 27/0006;
H04L 5/0053; H04L 5/0048; H04W
24/08; H04W 76/28; H04W 76/27; H04W
74/0808; H04B 7/0626; H04B 17/318;
Y02D 30/70
See application file for complete search history.

(56) References Cited

U.S. PATENT DOCUMENTS

| | | | | |
|---|---|---|---|---|
| 10,757,710 | B2* | 8/2020 | Zhou | H04W 72/21 |
| 10,784,944 | B2* | 9/2020 | Cirik | H04W 56/0045 |
| 10,863,570 | B2* | 12/2020 | Cirik | H04W 72/0446 |
| 10,887,073 | B2* | 1/2021 | Zhou | H04W 76/38 |
| 11,128,359 | B2* | 9/2021 | Zhou | H04W 72/23 |
| 11,888,575 | B2* | 1/2024 | Cirik | H04L 5/0023 |
| 2011/0274057 | A1 | 11/2011 | Kuo | |
| 2012/0176926 | A1 | 7/2012 | Jang et al. | |
| 2019/0132862 | A1* | 5/2019 | Jeon | H04L 5/0098 |
| 2019/0141742 | A1* | 5/2019 | Zhou | H04L 5/0064 |
| 2019/0149380 | A1* | 5/2019 | Babaei | H04W 72/23 370/330 |
| 2019/0207737 | A1* | 7/2019 | Babaei | H04L 5/0098 |
| 2019/0215888 | A1* | 7/2019 | Cirik | H04B 7/088 |
| 2019/0289513 | A1* | 9/2019 | Jeon | H04W 36/06 |
| 2021/0126763 | A1* | 4/2021 | Zhou | H04W 74/0841 |
| 2021/0167930 | A1* | 6/2021 | Jeon | H04L 27/2607 |
| 2021/0219196 | A1* | 7/2021 | Jeon | H04L 5/0098 |
| 2022/0078000 | A1* | 3/2022 | Bao | H04L 5/0098 |
| 2022/0217762 | A1* | 7/2022 | Jeon | H04L 5/0064 |
| 2023/0198603 | A1* | 6/2023 | Cirik | H04L 5/0023 375/262 |

FOREIGN PATENT DOCUMENTS

| | | |
|---|---|---|
| CN | 107911203 A | 4/2018 |
| WO | 2012023839 A2 | 2/2012 |
| WO | 2015106554 A1 | 7/2015 |
| WO | 2018085145 A1 | 5/2018 |
| WO | 2018121621 A1 | 7/2018 |

OTHER PUBLICATIONS

3GPP TS 38.321 V15.2.0 (Jun. 2018), 3rd Generation Partnership Project; Technical Specification Group Radio Access Network; NR; Medium Access Control (MAC) protocol specification(Release 15), 73 pages.

Samsung, "Wider Bandwidth Operations", 3GPP TSG RAN WG1 NR Ad-Hoc#2, Jun. 27-30, 2017, R1-1710761, 8 pages, Qingdao, P.R. China.

Qualcomm Incorporated, "CA and BWP", 3GPP TSG RAN WG1 NR AdHoc#3, Sep. 18-21, 2017, R1-1716440, 7 pages, Nagoya, Japan.

Qualcomm Incorporated, "Open Issues on CA", 3GPP TSG RAN WG1 #90bis, Oct. 9-13, 2017, R1-1718581, 10 pages, Prague, Czech Republic.

J. Jeon, "NR Wide Bandwidth Operations," in IEEE Communications Magazine, vol. 56, No. 3, Mar. 2018, 11 pages.

* cited by examiner

METHOD FOR DEACTIVATING CARRIER OR ACTIVATING CARRIER AND APPARATUS

CROSS-REFERENCE TO RELATED APPLICATIONS

This application is a continuation of International Application No. PCT/CN2019/089826, filed on Jun. 3, 2019, which claims priority to Chinese Patent Application No. 201810908393.4, filed on Aug. 10, 2018. The disclosures of the aforementioned applications are hereby incorporated by reference in their entireties.

TECHNICAL FIELD

This application relates to the field of communication technologies, and in particular, to a method for deactivating a carrier or activating a carrier and an apparatus.

BACKGROUND

In a wireless communications network such as long term evolution (LTE) or new radio (NR), to meet a requirement for a higher peak rate, a larger transmission bandwidth needs to be provided. Due to scarcity of contiguous large-bandwidth spectrums, carrier aggregation (CA) becomes a solution for providing a larger transmission bandwidth. The CA is to aggregate two or more component carriers (CC) to support a larger transmission bandwidth. The CCs may be generally classified into a primary component carrier (PCC) and a secondary component carrier (SCC). The PCC may also be referred to as a primary carrier or a primary cell (Pcell), and the SCC may also be referred to as a secondary carrier or a secondary cell (Scell).

Considering battery consumption of a terminal, a secondary carrier activation or deactivation mechanism is provided in the CA, to activate a secondary carrier when the terminal requires a larger transmission bandwidth, and deactivate a secondary carrier when the terminal does not require a large transmission bandwidth, thereby saving power. The secondary carrier activation or deactivation mechanism may be implemented by using a media access control control element (MAC CE) and/or a timer, or may be implemented by using physical layer control information. However, a speed of deactivating or activating the secondary carrier by using the MAC CE and/or the timer is low, and a speed of deactivating or activating the secondary carrier by using the physical layer control information is high, but introduction of the physical layer control information causes an increase in signaling overheads of a radio air interface. Therefore, how to quickly deactivate or quickly activate a secondary carrier without increasing signaling overheads of a radio air interface becomes a problem that urgently needs to be resolved.

SUMMARY

Embodiments of this application provide a method for deactivating a carrier or activating a carrier and an apparatus.

According to a first aspect, an embodiment of this application provides a method for deactivating a carrier, including the following.

A terminal receives first information, where the first information indicates a default bandwidth part (BWP), and the terminal deactivates a secondary carrier based on the default BWP.

According to the method provided in this embodiment of this application, the secondary carrier is deactivated by using physical layer control information for activating or deactivating a BWP, so that new physical layer control information does not need to be introduced for deactivating the secondary carrier. Therefore, relatively low signaling overheads can be maintained while the secondary carrier is quickly deactivated.

Optionally, the terminal receives second information, where the second information is used to indicate to deactivate the secondary carrier based on the default BWP and/or activate the default BWP. Further, optionally, the second information includes one or more of frequency domain resource allocation information, hybrid automatic repeat request (HARQ) process identification information, new data indication information, redundancy version information, physical uplink control channel (PUCCH) transmit power control command information, or modulation and coding scheme information. The terminal deactivates the secondary carrier based on the default BWP and/or activates the default BWP when values of one or more of the frequency domain resource allocation information, the HARQ process identification information, the new data indication information, the redundancy version information, the PUCCH transmit power control command information, or the modulation and coding scheme information are default values. According to this implementation, enabling and disabling of a function of deactivating the secondary carrier based on the default BWP can be controlled based on a power saving requirement and a performance requirement, so that both power saving and system performance are considered.

Optionally, the terminal deactivates the secondary carrier based on the default BWP and third information, where the third information includes one or more of the frequency domain resource allocation information, the modulation and coding scheme information, or carrier indication information, and the third information indicates the secondary carrier. Further, optionally, the third information includes information about at least one of a plurality of secondary carriers. According to this implementation, the to-be-deactivated secondary carrier can be finely controlled while relatively low signaling overheads are maintained.

Optionally, the default BWP is a BWP configured by a network device, or the default BWP is an initial active BWP.

Optionally, the default BWP is an inactive BWP.

According to a second aspect, an embodiment of this application provides a method for deactivating a carrier, including the following.

A network device sends first information, where the first information indicates a default BWP, and the default BWP is used to deactivate a secondary carrier.

According to the method provided in this embodiment of this application, the secondary carrier is deactivated by using physical layer control information for activating or deactivating a BWP, so that new physical layer control information does not need to be introduced for deactivating the secondary carrier. Therefore, relatively low signaling overheads can be maintained while the secondary carrier is quickly deactivated.

Optionally, the network device sends second information, where the second information is used to indicate to deactivate the secondary carrier based on the default BWP and/or activate the default BWP. Further, optionally, the second information includes one or more of frequency domain resource allocation information, HARQ process identification information, new data indication information, redundancy version information, PUCCH transmit power control command information, or modulation and coding scheme information. The second information is used to indicate to deactivate the secondary carrier based on the default BWP and/or activate the default BWP when values of one or more of the frequency domain resource allocation information, the HARQ process identification information, the new data indication information, the redundancy version information, the PUCCH transmit power control command information, or the modulation and coding scheme information are default values. According to this implementation, enabling and disabling of a function of deactivating the secondary carrier based on the default BWP can be controlled based on a power saving requirement and a performance requirement, so that both power saving and system performance are considered.

Optionally, the network device sends third information, where the third information includes one or more of the frequency domain resource allocation information, the modulation and coding scheme information, or carrier indication information, and the third information indicates the secondary carrier. Further, optionally, the third information includes information about at least one of a plurality of secondary carriers. According to this implementation, the to-be-deactivated secondary carrier can be finely controlled while relatively low signaling overheads are maintained.

Optionally, the default BWP is a BWP configured by the network device, or the default BWP is an initial active BWP.

Optionally, the default BWP is an inactive BWP.

According to a third aspect, an embodiment of this application provides a method for deactivating a carrier, including:

A terminal determines whether a BWP timer expires. When the terminal determines that the BWP timer expires, the terminal activates a default BWP and deactivates a secondary carrier. The default BWP may be a downlink BWP, or may be an uplink BWP. The default BWP may be included in a secondary carrier, or may be included in a primary carrier. There are one or more secondary carriers. Optionally, when the terminal determines that the BWP timer does not expire, the terminal does not activate the default BWP and does not deactivate the secondary carrier. Optionally, the default BWP is an inactive BWP. Optionally, the default BWP is a BWP configured by the network device, or the default BWP is an initial active BWP.

In this embodiment of this application, the terminal maintains the BWP timer. When the BWP timer expires, the terminal activates the default BWP and deactivates the one or more secondary carriers, so that the secondary carrier is deactivated without requiring the network device to deliver signaling, thereby reducing signaling overheads.

Optionally, the terminal receives fourth information, where the fourth information is used to indicate the terminal to deactivate the secondary carrier when the BWP timer expires. According to this implementation, enabling and disabling of a function of deactivating the secondary carrier based on whether the BWP timer expires can be controlled based on a power saving requirement and a performance requirement, so that both power saving and system performance are considered.

According to a fourth aspect, an embodiment of this application provides a method for deactivating a carrier, including: A network device sends fourth information, where the fourth information is used to indicate to deactivate a secondary carrier when a BWP timer expires. According to this implementation, enabling and disabling of a function of deactivating the secondary carrier based on whether the BWP timer expires can be controlled based on a power saving requirement and a performance requirement, so that both power saving and system performance are considered.

According to a fifth aspect, an embodiment of this application provides a method for activating a carrier, including the following.

A terminal receives fifth information, where the fifth information indicates a non-default BWP. The terminal activates the non-default BWP and activates a secondary carrier. The non-default BWP may be a downlink BWP, or may be an uplink BWP. The non-default BWP may be included in a secondary carrier, or may be included in a primary carrier.

Optionally, the fifth information is a BWP indicator from a network device. The terminal obtains the BWP indicator, where the BWP indicator indicates the non-default BWP, the BWP indicator may be included in DCI from the network device, and the DCI may be carried on a PDCCH.

Optionally, the non-default BWP is an inactive BWP. Optionally, the fifth information is used to indicate to activate the non-default BWP (which may also be understood as: the fifth information is used to indicate to switch to the non-default BWP). Alternatively, the fifth information is used to indicate to deactivate a default BWP and activate the non-default BWP (which may also be understood as: the fifth information is used to indicate to switch from the default BWP to the non-default BWP).

According to this embodiment of this application, the secondary carrier is activated by using physical layer control information for activating a BWP, so that new physical layer control information does not need to be introduced for activating the secondary carrier. Therefore, relatively low signaling overheads can be maintained while the secondary carrier is quickly activated.

Optionally, the terminal activates the secondary carrier based on the non-default BWP and sixth information from the network device. Further, optionally, the sixth information includes carrier indication information, and the sixth information indicates the secondary carrier. Further, optionally, the sixth information includes information about at least one of a plurality of secondary carriers. According to this implementation, the to-be-activated secondary carrier can be finely controlled while relatively low signaling overheads are maintained.

According to a sixth aspect, an embodiment of this application provides a method for activating a carrier, including:

A network device sends fifth information, where the fifth information indicates a non-default BWP, and the non-default BWP is used to activate a secondary carrier. According to the method provided in this embodiment of this application, the secondary carrier is activated by using physical layer control information for activating or deactivating a BWP, so that new physical layer control information does not need to be introduced for activating the secondary carrier. Therefore, relatively low signaling overheads can be maintained while the secondary carrier is quickly activated.

Optionally, the network device sends sixth information, where the sixth information includes carrier indication information, and the sixth information indicates the secondary carrier. Further, optionally, the sixth information includes information about at least one of a plurality of secondary carriers. According to this implementation, the to-be-activated secondary carrier can be finely controlled while relatively low signaling overheads are maintained.

According to a seventh aspect, an embodiment of this application provides a communications apparatus, to implement one or more corresponding functions of the terminal or the network device. The communications apparatus includes a corresponding unit or component configured to perform the foregoing methods. The unit included in the communications apparatus may be implemented by software and/or hardware. For example, the communications apparatus may be a terminal, a network device (for example, a base station), or a chip, a chip system, a processor, or the like that can support a terminal or a network device in implementing the foregoing functions.

According to an eighth aspect, an embodiment of this application provides a communications apparatus, including a processor. The processor is coupled to a memory, the memory is configured to store a program, and when the program is executed by the processor, the communications apparatus is enabled to implement the method according to any one of the foregoing aspects.

According to a ninth aspect, an embodiment of this application provides a storage medium. The storage medium stores a computer program. When the computer program is executed by a processor, the method according to any one of the foregoing aspects is implemented.

According to a tenth aspect, an embodiment of this application provides a chip system, including a processor, configured to perform the method according to any one of the foregoing aspects.

According to an eleventh aspect, this application provides a communications system, including the terminal and the network device.

BRIEF DESCRIPTION OF THE DRAWINGS

FIG. 8A-1 is a first schematic diagram of a default BWP and carriers according to an embodiment of this application;

FIG. 8A-2 is a second schematic diagram of a default BWP and carriers according to an embodiment of this application;

FIG. 8A-3 is a third schematic diagram of default BWPs and carriers according to an embodiment of this application;

FIG. 8B-1 is a fourth schematic diagram of a default BWP and carriers according to an embodiment of this application;

FIG. 8B-2 is a fifth schematic diagram of a default BWP and carriers according to an embodiment of this application;

FIG. 13A-1 is a first schematic diagram of a non-default BWP and carriers according to an embodiment of this application;

FIG. 13A-2 is a second schematic diagram of a non-default BWP and carriers according to an embodiment of this application;

FIG. 13A-3 is a third schematic diagram of non-default BWPs and carriers according to an embodiment of this application;

FIG. 13B-1 is a fourth schematic diagram of a non-default BWP and carriers according to an embodiment of this application;

FIG. 13B-2 is a fifth schematic diagram of a non-default BWP and carriers according to an embodiment of this application;

DETAILED DESCRIPTION OF ILLUSTRATIVE EMBODIMENTS

Figure 1:
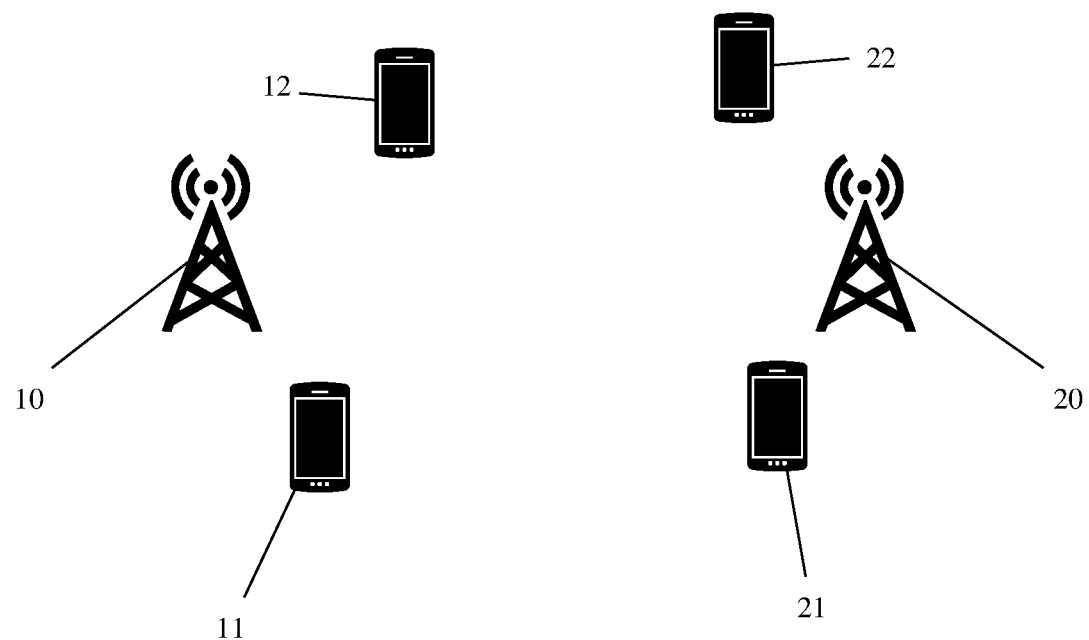
FIG. 1 is a schematic diagram of a communications system to which a method is applied according to this application.

A method for deactivating a carrier or activating a carrier and an apparatus that are provided in the embodiments of this application may be applied to a communications system. FIG. 1 is a schematic structural diagram of a communications system. The communications system includes one or more network devices (for clarity, a network device 10 and a network device 20 are shown in the figure), and one or more terminal devices that communicate with the one or more network devices. In FIG. 1, a terminal device 11 and a terminal device 12 communicate with the network device 10, and a terminal device 21 and a terminal device 22 communicate with the network device 20.

The technologies described in the embodiments of the present application may be applied to various communications systems, for example, a 2G, 3G, 4G, 4.5G, or 5G communications system, a system obtained by integrating a plurality of communications systems, or a future evolved network, for example, a long term evolution (LTE) system, a new radio (NR) system, a wireless-fidelity (WiFi) system, a cellular system related to the 3rd generation partnership project (3GPP), and other similar communications systems.

Figure 2:
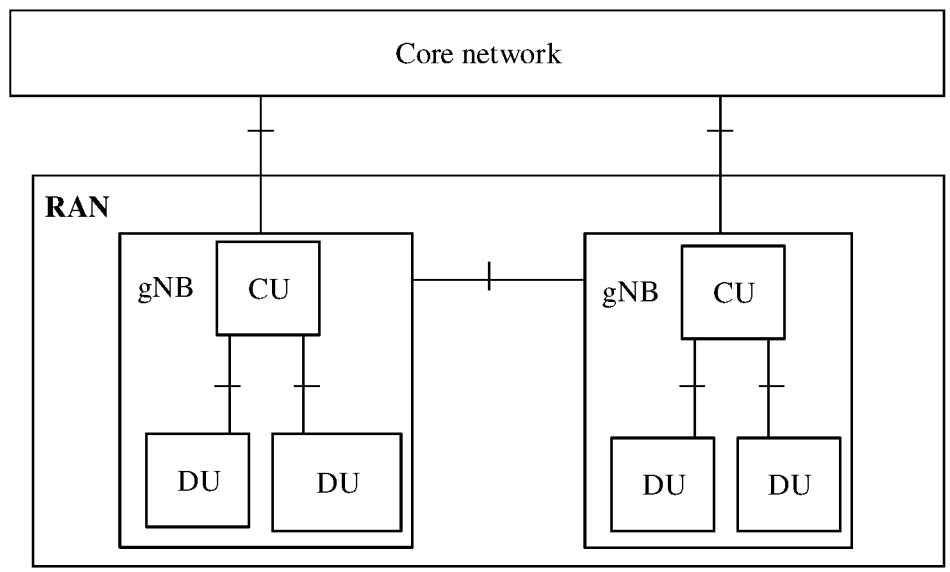
FIG. 2 is a schematic diagram of an example of an architecture of a communications system.

FIG. 2 is a schematic diagram of an example of a possible architecture of a communications system. As shown in FIG. 2, a network device in a radio access network RAN is a base station (for example, a gNB) in a CU-DU separated architecture. The RAN may be connected to a core network (for example, an LTE core network or a 5G core network). A CU and a DU may be understood as division of the base station from a logical function perspective. The CU and the DU may be physically separated or physically deployed together. A function of the RAN is terminated on the CU. A plurality of DUs may share one CU. One DU may alternatively be connected to a plurality of CUs (not shown in the figure).

The CU and the DU may be connected through an interface, for example, an F1 interface. The CU and the DU may be divided based on protocol layers of a wireless network. For example, functions of a packet data convergence protocol (PDCP) layer and a radio resource control (RRC) layer are set on the CU, and functions of a radio link control (RLC) layer, a media access control (MAC) layer, and a physical layer are set on the DU. It may be understood that division of processing functions of the CU and the DU based on the protocol layers is merely an example, and the processing functions of the CU and the DU may alternatively be divided in another manner. For example, the CU or the DU may have functions of more protocol layers. For example, the CU or the DU may alternatively have some processing functions of protocol layers. In a design, some functions of the RLC layer and functions of a protocol layer above the RLC layer are set on the CU, and remaining functions of the RLC layer and functions of a protocol layer below the RLC layer are set on the DU. In another design, functions of the CU or the DU may alternatively be divided based on a service type or another system requirement. For example, division is performed based on latency. Functions for which a processing time needs to satisfy a latency requirement are set on the DU, and functions for which a processing time does not need to satisfy the latency requirement are set on the CU. A network architecture shown in FIG. 2 may be applied to a 5G communications system, or may share one or more components or resources with an LTE system. In another design, the CU may alternatively have one or more functions of the core network. One or more CUs may be disposed together or separately. For example, the CUs may be all disposed on a network side for management. The DU may have a plurality of radio frequency functions, and the radio frequency functions may be remotely set.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function. The network device includes but is not limited to: an evolved NodeB (NodeB, eNB, or e-NodeB, evolutional NodeB) in LTE, a gNodeB (gNB) or a transmission reception point (TRP) in NR, a subsequent evolved 3GPP base station, an access node, a wireless relay node, and a wireless backhaul node in a Wi-Fi system, and the like. The base station may be a macro base station, a micro base station, a picocell base station, a small cell, a relay station, a balloon station, or the like. A plurality of base stations can support networks using a same technology described above, or may support networks using different technologies described above. The base station may include one or more co-site or non-co-site TRPs. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with a terminal device via a relay station. The terminal device may communicate with a plurality of base stations using different technologies. For example, the terminal device may communicate with a base station supporting an LTE network, may communicate with a base station supporting a 5G network, or may support dual connectivity with a base station in an LTE network and a base station in a 5G network.

The terminal is a device having a wireless transceiver function. The terminal may be deployed on land, indoor or outdoor, or may be hand-held, wearable, or vehicle-mounted; may be deployed on a water surface (for example, on a ship); or may be deployed in the air (for example, on an airplane, a balloon, or a satellite). The terminal may be a mobile phone, a tablet computer (Pad), a computer with wireless receiving and sending functions, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in smart grid, a wireless terminal in transportation safety, a wireless terminal in smart city, a wireless terminal in smart home, a wearable terminal device, or the like. An application scenario is not limited in the embodiments of this application. The terminal sometimes may also be referred to as a terminal device, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communications device, a UE agent, a UE apparatus, or the like. The terminal may be fixed or movable.

In a wireless communications network such as LTE or 5G NR, to meet a requirement for a higher peak rate, a larger transmission bandwidth needs to be provided. Due to scarcity of contiguous large-bandwidth spectrums, carrier aggregation (CA) becomes a solution for providing a larger transmission bandwidth. The CA is to aggregate two or more component carriers (CC) to support a larger transmission bandwidth. The CCs may be generally classified into a primary component carrier (PCC) and a secondary component carrier (SCC). The PCC may also be referred to as a primary carrier or a primary cell (Pcell), and the primary carrier is determined when a terminal establishes a connection. The SCC may also be referred to as a secondary carrier or a secondary cell (Scell). A network device may configure one or more secondary carriers for the terminal.

Considering battery consumption of a terminal, a secondary carrier activation or deactivation mechanism is provided in the CA, to activate a secondary carrier when the terminal requires a larger transmission bandwidth, and deactivate a secondary carrier when the terminal does not require a large transmission bandwidth, thereby saving power. The secondary carrier activation or deactivation mechanism may be implemented by using a media access control control element (MAC CE) and/or a timer, or may be implemented by using physical layer control information. However, a speed of deactivating or activating the secondary carrier by using the MAC CE and/or the timer is low, and a speed of deactivating or activating the secondary carrier by using the physical layer control information is high, but introduction of the physical layer control information causes an increase in signaling overheads of a radio air interface. Therefore, how to quickly deactivate or quickly activate a secondary carrier without increasing signaling overheads of a radio air interface becomes a problem that urgently needs to be resolved.

According to the method for deactivating a carrier or activating a carrier and the apparatus provided in the embodiments of this application, a secondary carrier is deactivated or activated by using physical layer control information indicating a bandwidth part (BWP), so that not only the secondary carrier can be quickly deactivated or a carrier can be quickly activated, but also signaling overheads of a radio air interface can be reduced.

The following describes the technical solutions of this application in detail by using specific embodiments with reference to the accompanying drawings. The following several specific embodiments and implementations may be combined with each other, and same or similar concepts or processes may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may also be implemented in a computer processor and a memory coupled to the processor.

In the embodiments of this application, that a carrier A may cross-carrier schedule a carrier B means that physical layer control information received by a terminal on the carrier A may control the terminal to receive or send data on the carrier B, and the physical layer control information may also be referred to as cross-carrier physical layer control information. The carrier A may be a primary carrier or a secondary carrier, and the carrier B is a secondary carrier.

In the embodiments of this application, that a carrier A may perform self-carrier scheduling means that physical layer control information received by a terminal on the carrier A may control the terminal to receive or send data on the carrier A, and the physical layer control information may also be referred to as self-carrier physical layer control information. The carrier A may be a primary carrier or a secondary carrier.

That the terminal receives the physical layer control information on the carrier A may be understood as: the terminal receives the physical layer control information on configured or predefined physical resources on the carrier A. The configured or predefined physical resources may also be referred to as a search space. It may be understood that the terminal may receive the self-carrier physical layer control information on search space 1, and may receive the cross-carrier physical layer control information on search space 2. The search space 1 may also be referred to as a self-carrier scheduling search space of the carrier A, and the search space 2 may also be referred to as a cross-carrier scheduling search space of the carrier A.

The BWP in the embodiments of this application may be a segment of contiguous frequency domain resources in frequency domain. For example, one BWP includes one or more contiguous subcarriers in frequency domain, or one BWP includes one or more contiguous resource blocks in frequency domain, or one BWP includes one or more contiguous resource block groups in frequency domain. Different BWPs may have different bandwidths. The BWP in the embodiments of this application may also be referred to as a carrier bandwidth part, a subband bandwidth, a narrowband bandwidth, or another name. A name of the BWP is not limited in this application. Frequency domain resources included in one BWP are a subset of frequency domain resources included in one primary carrier/one secondary carrier. In other words, frequency domain resources included in one BWP may be fewer than or equal to frequency domain resources included in one primary carrier/one secondary carrier. The network device may configure different BWPs for different terminals.

Figure 3:
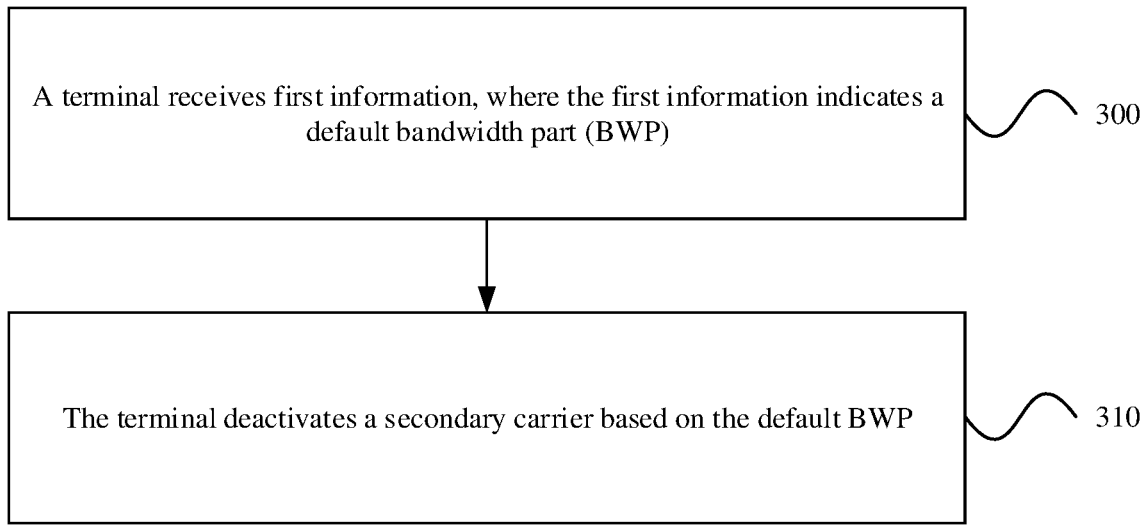
FIG. 3 is a flowchart of a method for deactivating a carrier according to an embodiment of this application.

FIG. 3 is a schematic flowchart of a method for deactivating a carrier according to an embodiment of this application. As shown in FIG. 3, the method in this embodiment may include the following steps.

Step 300: A terminal receives first information, where the first information indicates a default BWP. The default BWP may be a downlink BWP, or may be an uplink BWP. The default BWP may be included in a secondary carrier, or may be included in a primary carrier. Optionally, the default BWP is an inactive BWP, and the first information is used to indicate to activate the default BWP (which may also be understood as: the first information is used to indicate to switch to the default BWP).

Step 310: The terminal deactivates a secondary carrier based on the default BWP. There may be one or more secondary carriers.

In a possible implementation of step 300, the first information is downlink control information (DCI) from a network device. The terminal receives the DCI, where the DCI indicates the default BWP. The DCI may be carried on a physical downlink control channel (PDCCH). Optionally, the DCI includes a BWP indicator, and the BWP indicator indicates the default BWP.

In another possible implementation of step 300, the first information is a BWP indicator from a network device. The terminal obtains the BWP indicator, where the BWP indicator indicates the default BWP. The BWP indicator may be included in DCI from the network device, and the DCI may be carried on a PDCCH.

That the first information indicates the default BWP in this embodiment of this application may be understood as: the first information is used to indicate the terminal to activate or use the default BWP, or may be understood as: the first information is used to indicate the terminal to deactivate or not to use the default BWP.

It may be understood that the default BWP in this embodiment of this application may be a BWP configured by the network device for the terminal. Optionally, the network device may send higher layer signaling (for example, RRC signaling), and configure the default BWP for the terminal by using the higher layer signaling. Alternatively, the default BWP in this embodiment of this application may be an initial active BWP. For example, the initial active BWP is a BWP used by the terminal for initial access.

In a possible implementation of step 310, if the terminal determines that the first information indicates the default BWP, the terminal deactivates the secondary carrier. Optionally, when the terminal determines that the first information does not indicate the default BWP, the terminal does not deactivate the secondary carrier.

Figure 4:
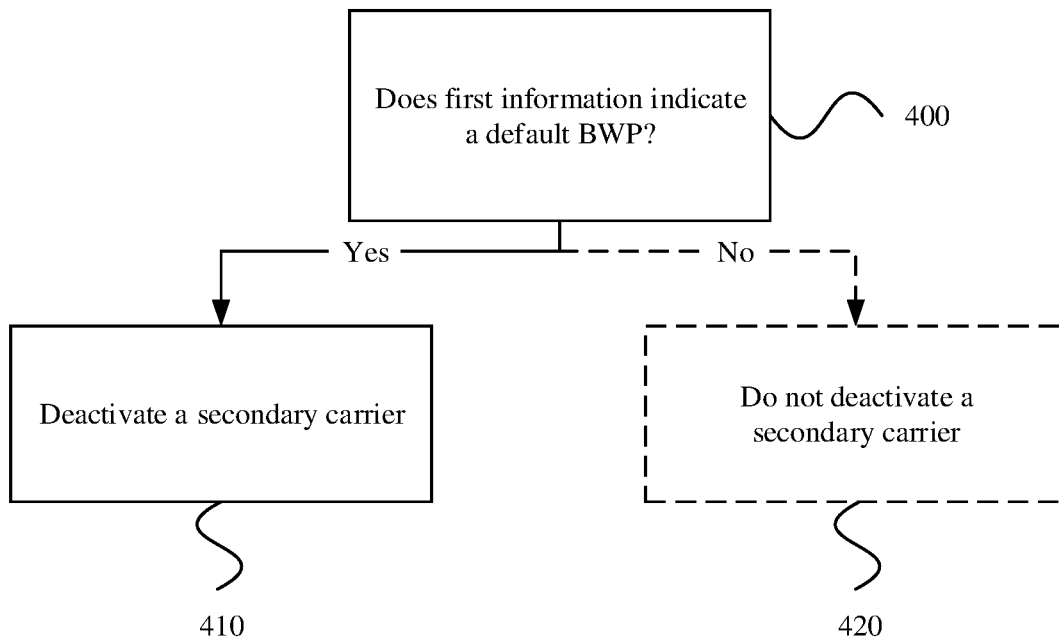
FIG. 4 is a flowchart of a method for deactivating a carrier based on a default BWP according to an embodiment of this application.

FIG. 4 is used as an example to describe a possible process of the foregoing implementation of step 310. Based on step 400, the terminal determines, based on the received first information, whether the first information indicates the default BWP. When the first information indicates the default BWP, the terminal performs step 410, to be specific, deactivates the secondary carrier. Optionally, when the first information does not indicate the default BWP, the terminal performs step 420, to be specific, does not deactivate the secondary carrier.

According to this embodiment of this application, the secondary carrier is deactivated by using physical layer control information for activating or deactivating a BWP, so that new physical layer control information does not need to be introduced for deactivating the secondary carrier. Therefore, relatively low signaling overheads can be maintained while the secondary carrier is quickly deactivated.

In step 310 of FIG. 3, the terminal needs to determine which secondary carrier or which secondary carriers are to be deactivated.

Figure 5:
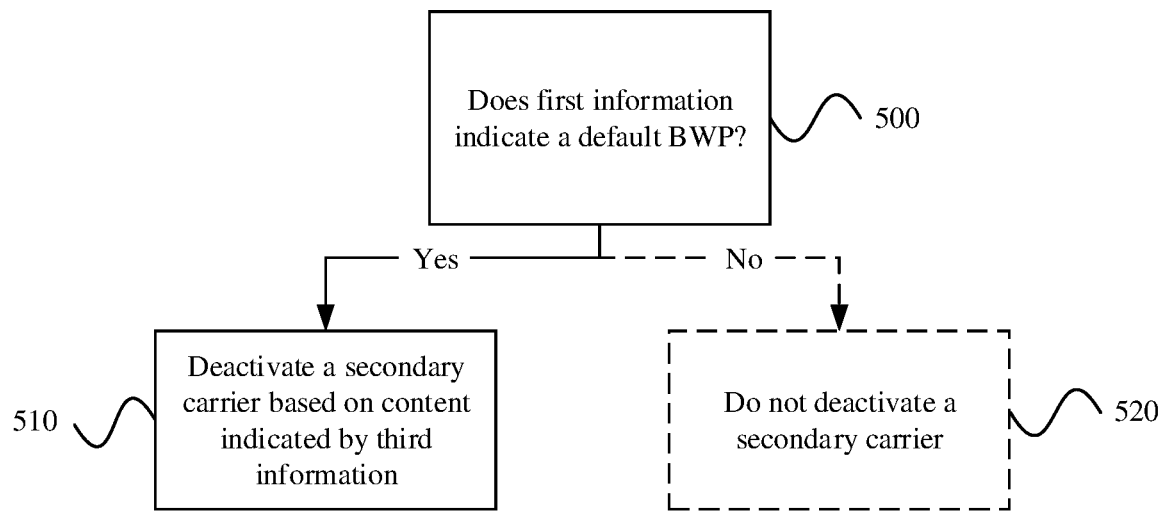
FIG. 5 is a flowchart of another method for deactivating a carrier based on a default BWP according to an embodiment of this application.

In a possible implementation of step 310, the terminal deactivates the secondary carrier based on the default BWP and third information from the network device. Optionally, the third information may be physical layer control information (for example, DCI) from the network device. It may be understood that the third information is existing physical layer control information, instead of new physical layer control information introduced for deactivating the secondary carrier. FIG. 5 is a flowchart of this implementation. In FIG. 5, the terminal deactivates the secondary carrier with reference to the first information and the third information. Based on step 500, the terminal determines, based on the received first information, whether the first information indicates the default BWP. When the first information indicates the default BWP, the terminal performs step 510, to be specific, deactivates the one or more secondary carriers based on content indicated by the third information. Optionally, when the first information does not indicate the default BWP, the terminal performs step 520, to be specific, does not deactivate the secondary carrier. It may be understood that the third information in step 510 indicates which secondary carrier or which secondary carriers are to be deactivated. According to this implementation, the to-be-deactivated secondary carrier can be finely controlled while relatively low signaling overheads are maintained.

In a possible implementation method of step 510, the third information indicates one secondary carrier, and the terminal deactivates the one secondary carrier based on the third information.

In another possible implementation method of step 510, the third information indicates a plurality of secondary carriers, and the terminal deactivates the plurality of secondary carriers based on the third information.

In still another possible implementation method of step 510, the third information indicates at least one of a plurality of secondary carriers, and the terminal deactivates the plurality of secondary carriers based on the third information. For example, two secondary carriers (a secondary carrier 1 and a secondary carrier 2) are used as examples. The third information indicates the secondary carrier 1, and the terminal deactivates the secondary carrier 1 and the secondary carrier 2 based on the third information. According to this implementation method, when a plurality of secondary carriers need to be deactivated, not all the plurality of secondary carriers need to be indicated, but only some (for example, one of the plurality of secondary carriers) of the plurality of secondary carriers may be indicated, to reduce indication overheads. The plurality of secondary carriers may be considered as a group of secondary carriers. Specific secondary carriers in the group of secondary carriers may be predefined, or may be configured by the network device by using higher layer signaling (for example, RRC signaling or MAC CE signaling).

In a possible implementation method of the third information, the third information includes carrier indication information. For example, the carrier indication information indicates one secondary carrier, and the terminal deactivates the secondary carrier based on the carrier indication information. For another example, the carrier indication information indicates a plurality of secondary carriers, and the terminal deactivates the plurality of secondary carriers based on the carrier indication information. For still another example, the carrier indication information indicates at least one of a plurality of secondary carriers, and the terminal deactivates the plurality of secondary carriers based on the carrier indication information. According to the implementation method of the third information, existing indication information (namely, the carrier indication information) may be reused to finely control the to-be-deactivated secondary carrier, to maintain relatively low signaling overheads.

Figure 6A:
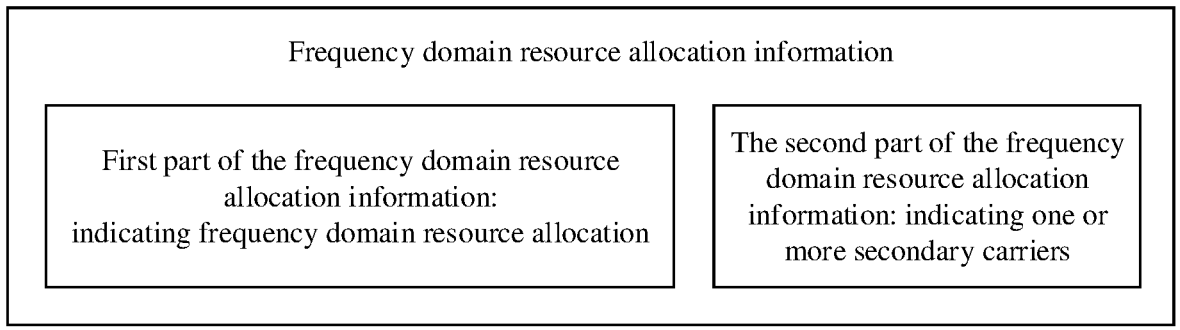
FIG. 6A is a schematic diagram of frequency domain resource allocation information according to an embodiment of this application.

In another possible implementation method of the third information, the third information includes frequency domain resource allocation information. FIG. 6A is used as an example to show content included in the frequency domain resource allocation information. The frequency domain resource allocation information includes two parts: a first part of the frequency domain resource allocation information and a second part of the frequency domain resource allocation information. The first part of the frequency domain resource allocation information may be understood as some bits in the frequency domain resource allocation information, and the second part of the frequency domain resource allocation information may be understood as some bits or all bits other than the foregoing bits in the frequency domain resource allocation information. The first part of the frequency domain resource allocation information indicates frequency domain resource allocation, and the second part of the frequency domain resource allocation information indicates one or more secondary carriers. The terminal may deactivate the one or more secondary carriers based on the one or more secondary carriers indicated by the second part of the frequency domain resource allocation information. For example, the second part of the frequency domain resource allocation information indicates one secondary carrier, and the terminal deactivates the secondary carrier based on the second part of the frequency domain resource allocation information. For another example, the second part of the frequency domain resource allocation information indicates a plurality of secondary carriers, and the terminal deactivates the plurality of secondary carriers based on the second part of the frequency domain resource allocation information. For still another example, the second part of the frequency domain resource allocation information indicates at least one of a plurality of secondary carriers, and the terminal deactivates the plurality of secondary carriers based on the second part of the frequency domain resource allocation information. According to the implementation method of the third information, existing indication information (namely, the frequency domain resource allocation information) may be reused to finely control the to-be-deactivated secondary carrier, to maintain relatively low signaling overheads.

An implementation method in which the terminal deactivates the secondary carrier based on some information in the frequency domain resource allocation information may be used in the following scenario: The first information indicates the terminal to activate the default BWP (that is, switch to the default BWP), and the terminal switches from a previous working BWP to the default BWP. A bandwidth of the default BWP is less than a bandwidth of the previous working BWP of the terminal. For example, M (M>0) bits are used to indicate frequency domain resource allocation on the previous working BWP, and N (0<N<M) bits are used to indicate frequency domain resource allocation on the default BWP. The frequency domain resource allocation information may include M bits, the first part of the frequency domain resource allocation information includes N bits, and the second part of the frequency domain resource allocation information includes (M-N) bits. In other words, it may be understood that switching from a BWP with a large bandwidth to a BWP with a small bandwidth may cause some redundant bits in the frequency domain resource allocation information, and the redundant bits may be used to indicate the to-be-deactivated secondary carrier. It may be understood that a location of the second part of the frequency domain resource allocation information in the frequency domain resource allocation information in FIG. 6A is merely an example. A location of the second part of the frequency domain resource allocation information in the frequency domain resource allocation information may be predefined, or may be configured by the network device. For example, the (M-N) bits (namely, the second part of the frequency domain resource allocation information) may be (M-N) high-order bits of the frequency domain resource allocation information, or (M-N) low-order bits of the frequency domain resource allocation information, or (M-N) bits at another location in the frequency domain resource allocation information. According to the method, redundant bits in existing indication information (namely, the frequency domain resource allocation information) may be reused to finely control the to-be-deactivated secondary carrier, to maintain relatively low signaling overheads.

The second part of the frequency domain resource allocation information may indicate one secondary carrier. For example, the second part of the frequency domain resource allocation information includes two bits, and one of a maximum of four secondary carriers may be indicated. For example, the second part of the frequency domain resource allocation information is "00", to indicate a secondary carrier 1. The second part of the frequency domain resource allocation information is "01", to indicate a secondary carrier 2. The second part of the frequency domain resource allocation information is "10", to indicate a secondary carrier 3. The second part of the frequency domain resource allocation information is "11", to indicate a secondary carrier 4.

The second part of the frequency domain resource allocation information may also indicate one or more secondary carriers by using a bitmap. To be specific, one bit in the second part of the frequency domain resource allocation information represents one secondary carrier. When the bit is 0, it indicates that a secondary carrier corresponding to the bit is not indicated (which may also be understood as indicating that the secondary carrier is not to be deactivated). When the bit is 1, it indicates that a secondary carrier corresponding to the bit is indicated (which may also be understood as indicating that the secondary carrier is to be deactivated). For example, the second part of the frequency domain resource allocation information includes two bits "XY", where a bit Y represents a secondary carrier 1, and a bit X represents a secondary carrier 2. For example, the second part of the frequency domain resource allocation information is "00", to indicate that neither the secondary carrier 1 nor the secondary carrier 2 is indicated. The second part of the frequency domain resource allocation information is "01", to indicate that the secondary carrier 1 is indicated. The second part of the frequency domain resource allocation information is "10", to indicate that the secondary carrier 2 is indicated. The second part of the frequency domain resource allocation information is "11", to indicate that both the secondary carrier 1 and the secondary carrier 2 are indicated. It may be understood that, in the foregoing example, an example in which a bit 1 indicates that a secondary carrier corresponding to the bit is indicated, and a bit 0 indicates that a secondary carrier corresponding to the bit is not indicated is merely used. In this embodiment of this application, an implementation method in which a bit 0 indicates that a secondary carrier corresponding to the bit is indicated, and a bit 1 indicates that a secondary carrier corresponding to the bit is not indicated is also supported.

Figure 6B:
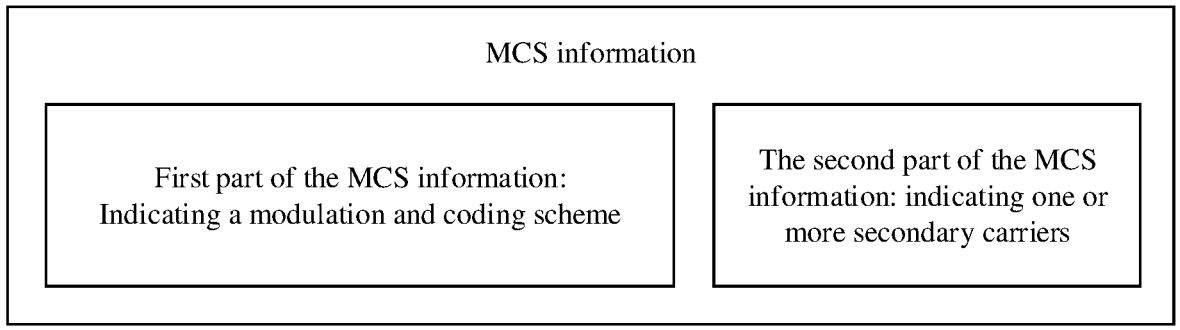
FIG. 6B is a schematic diagram of modulation and coding scheme information according to an embodiment of this application.

In another possible implementation method of the third information, the third information includes modulation and coding scheme (MCS) information. FIG. 6B is used as an example to show content included in the MCS information. The MCS information includes two parts: a first part of the MCS information and a second part of the MCS information. The first part of the MCS information may be understood as some bits in the MCS information, and the second part of the MCS information may be understood as some bits or all bits other than the foregoing bits in the MCS information. The first part of the MCS information indicates a modulation and coding scheme, and the second part of the MCS information indicates one or more secondary carriers. The terminal may deactivate the one or more secondary carriers based on the one or more secondary carriers indicated by the second part of the MCS information. For example, the second part of the MCS information indicates one secondary carrier, and the terminal deactivates the secondary carrier based on the second part of the MCS information. For another example, the second part of the MCS information indicates a plurality of secondary carriers, and the terminal deactivates the plurality of secondary carriers based on the second part of the MCS information. For still another example, the second part of the MCS information indicates at least one of a plurality of secondary carriers, and the terminal deactivates the plurality of secondary carriers based on the second part of the MCS information. According to the implementation method of the third information, existing indication information (namely, the MCS information) may be reused to finely control the to-be-deactivated secondary carrier, to maintain relatively low signaling overheads.

An implementation method in which the terminal deactivates the secondary carrier based on some information in the MCS information may be used in the following scenario: The first information indicates the terminal to activate the default BWP (that is, switch to the default BWP), and the terminal switches from a previous working BWP to the default BWP. A bandwidth of the default BWP is less than a bandwidth of the previous working BWP of the terminal. For example, M' (M'>0) bits are used to indicate an MCS on the previous working BWP, and N' (0<N'<M') bits are used to indicate an MCS on the default BWP. The MCS information may include M' bits, the first part of the MCS information includes N' bits, and the second part of the MCS information includes (M'-N') bits. In other words, it may be understood that switching from a BWP with a large bandwidth to a BWP with a small bandwidth may cause some redundant bits in the MCS information, and the redundant bits may be used to indicate the to-be-deactivated secondary carrier. It may be understood that a location of the second part of the MCS information in the MCS information in FIG. 6B is merely an example. A location of the second part of the MCS information in the frequency domain resource allocation information may be predefined, or may be configured by the network device. For example, the (M'-N') bits (that is, the second part of the MCS information) may be (M'-N') high-order bits of the MCS information, or (M'-N') low-order bits of the MCS information, or (M'-N') bits at another location in the MCS information.

For specific descriptions of the second part of the MCS information, refer to the foregoing descriptions of the second part of the frequency domain resource allocation information. Details are not described herein again.

In another possible implementation method of the third information, the third information includes carrier indication information and frequency domain resource allocation information. The frequency domain resource allocation information includes a first part of the frequency domain resource allocation information and a second part of the frequency domain resource allocation information. The carrier indication information and the second part of the frequency domain resource allocation information indicate one or more secondary carriers. The terminal may deactivate the one or more secondary carriers based on the one or more secondary carriers indicated by the carrier indication information and the second part of the frequency domain resource allocation information. For example, the carrier indication information and the second part of the frequency domain resource allocation information indicate one secondary carrier, and the terminal deactivates the secondary carrier based on the carrier indication information and the second part of the frequency domain resource allocation information. For another example, the carrier indication information and the second part of the frequency domain resource allocation information indicate a plurality of secondary carriers, and the terminal deactivates the plurality of secondary carriers based on the carrier indication information and the second part of the frequency domain resource allocation information. For still another example, the carrier indication information and the second part of the frequency domain resource allocation information indicate at least one of a plurality of secondary carriers, and the terminal deactivates the plurality of secondary carriers based on the carrier indication information and the second part of the frequency domain resource allocation information. By jointly using the carrier indication information and the frequency domain resource allocation information, more to-be-deactivated secondary carriers can be indicated in comparison with a possible implementation method using only one of the carrier indication information, the frequency domain resource allocation information, and the MCS information, so that more power can be saved.

In another possible implementation method of the third information, the third information includes carrier indication information and MCS information. The MCS information includes a first part of the MCS information and a second part of the MCS information. The carrier indication information and the second part of the MCS information indicate one or more secondary carriers. The terminal may deactivate the one or more secondary carriers based on the one or more secondary carriers indicated by the carrier indication information and the second part of the MCS information. For example, the carrier indication information and the second part of the MCS information indicate one secondary carrier, and the terminal deactivates the secondary carrier based on the carrier indication information and the second part of the MCS information. For another example, the carrier indication information and the second part of the MCS information indicate a plurality of secondary carriers, and the terminal deactivates the plurality of secondary carriers based on the carrier indication information and the second part of the MCS information. For still another example, the carrier indication information and the second part of the MCS information indicate at least one of a plurality of secondary carriers, and the terminal deactivates the plurality of secondary carriers based on the carrier indication information and the second part of the MCS information. By jointly using the carrier indication information and the MCS information, more to-be-deactivated secondary carriers can be indicated in comparison with a possible implementation method using only one of the carrier indication information, the frequency domain resource allocation information, and the MCS information, so that more power can be saved.

In another possible implementation method of the third information, the third information includes frequency domain resource allocation information and MCS information. The frequency domain resource allocation information includes a first part of the frequency domain resource allocation information and a second part of the frequency domain resource allocation information. The MCS information includes a first part of the MCS information and a second part of the MCS information. The second part of the frequency domain resource allocation information and the second part of the MCS information indicate one or more secondary carriers. The terminal may deactivate the one or more secondary carriers based on the one or more secondary carriers indicated by the second part of the frequency domain resource allocation information and the second part of the MCS information. For example, the second part of the frequency domain resource allocation information and the second part of the MCS information indicate one secondary carrier, and the terminal deactivates the secondary carrier based on the second part of the frequency domain resource allocation information and the second part of the MCS information. For another example, the second part of the frequency domain resource allocation information and the second part of the MCS information indicate a plurality of secondary carriers, and the terminal deactivates the plurality of secondary carriers based on the second part of the frequency domain resource allocation information and the second part of the MCS information. For still another example, the second part of the frequency domain resource allocation information and the second part of the MCS information indicate at least one of a plurality of secondary carriers, and the terminal deactivates the plurality of secondary carriers based on the second part of the frequency domain resource allocation information and the second part of the MCS information. By jointly using the frequency domain resource allocation information and the MCS information, more to-be-deactivated secondary carriers can be indicated in comparison with a possible implementation method using only one of the carrier indication information, the frequency domain resource allocation information, and the MCS information, so that more power can be saved.

In another possible implementation method of the third information, the third information includes carrier indication information, frequency domain resource allocation information, and MCS information. The frequency domain resource allocation information includes a first part of the frequency domain resource allocation information and a second part of the frequency domain resource allocation information. The MCS information includes a first part of the MCS information and a second part of the MCS information. The carrier indication information, the second part of the frequency domain resource allocation information, and the second part of the MCS information indicate one or more secondary carriers. The terminal may deactivate the one or more secondary carriers based on the one or more secondary carriers indicated by the carrier indication information, the second part of the frequency domain resource allocation information, and the second part of the MCS information. For example, the carrier indication information, the second part of the frequency domain resource allocation information, and the second part of the MCS information indicate one secondary carrier, and the terminal deactivates the secondary carrier based on the carrier indication information, the second part of the frequency domain resource allocation information, and the second part of the MCS information. For another example, the carrier indication information, the second part of the frequency domain resource allocation information, and the second part of the MCS information indicate a plurality of secondary carriers, and the terminal deactivates the plurality of secondary carriers based on the carrier indication information, the second part of the frequency domain resource allocation information, and the second part of the MCS information. For still another example, the carrier indication information, the second part of the frequency domain resource allocation information, and the second part of the MCS information indicate at least one of a plurality of secondary carriers, and the terminal deactivates the plurality of secondary carriers based on the carrier indication information, the second part of the frequency domain resource allocation information, and the second part of the MCS information. By jointly using the carrier indication information, the frequency domain resource allocation information, and the MCS information, more to-be-deactivated secondary carriers can be indicated in comparison with a possible implementation method using only any two of the foregoing three types of information, so that more power can be saved.

Figure 7:
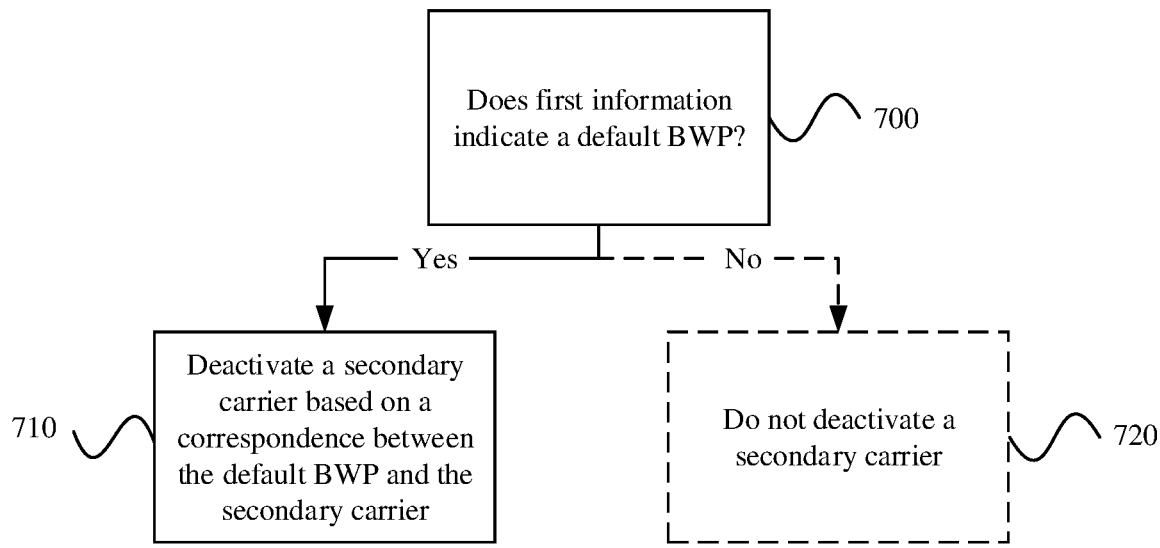
FIG. 7 is a flowchart of still another method for deactivating a carrier based on a default BWP according to an embodiment of this application.

In another possible implementation of step 310, the terminal deactivates the secondary carrier based on a correspondence between the default BWP and the secondary carrier. It may be understood that the correspondence between the default BWP and the secondary carrier may be predefined, or may be configured by the network device for the terminal by using higher layer signaling (for example, RRC signaling). FIG. 7 is a flowchart of this implementation. Based on step 700, the terminal determines, based on the received first information, whether the first information indicates the default BWP. When the first information indicates the default BWP, the terminal performs step 710, to be specific, deactivates one or more secondary carriers based on a correspondence between the default BWP and the one or more secondary carriers. Optionally, when the first information does not indicate the default BWP, the terminal performs step 720, to be specific, does not deactivate the secondary carrier. According to this implementation, the to-be-deactivated secondary carrier can be controlled while relatively low signaling overheads are maintained.

For example, the correspondence between the default BWP and the secondary carrier meets Table 1. The terminal receives the first information, where the first information indicates the default BWP. The terminal deactivates a secondary carrier 1. Optionally, if the secondary carrier 1 may cross-carrier schedule one or more other secondary carriers, the terminal may further deactivate the one or more other secondary carriers. For example, the secondary carrier 1 may cross-carrier schedule a secondary carrier 2, and the terminal receives the first information, where the first information indicates the default BWP. In this case, the terminal deactivates the secondary carrier 1 and the secondary carrier 2.

TABLE 1

Correspondence between the default BWP and the secondary carrier

| Default BWP | Secondary carrier 1 |
| --- | --- |

For example, the correspondence between the default BWP and the secondary carrier meets Table 2. The terminal receives the first information, where the first information indicates the default BWP. The terminal deactivates a secondary carrier 1 and a secondary carrier 2.

TABLE 2

Correspondence between the default BWP and the secondary carrier

| Default BWP | Secondary carrier 1 and secondary carrier 2 |
| --- | --- |

Table 1 and Table 2 describe this implementation only by using an example in which the default BWP corresponds to one or two secondary carriers. It may be understood that, a quantity of secondary carriers corresponding to the default BWP is not limited in the implementation of this application.

In a possible implementation of the embodiment of this application shown in FIG. 3, the secondary carrier (that is, the to-be-deactivated secondary carrier) does not include the default BWP. It may be understood that in a possible scenario, a bandwidth of the default BWP is relatively small. Therefore, when the terminal is indicated to activate the default BWP, it means that the terminal works in a more power-saving mode. In this case, the secondary carrier that does not include the default BWP is deactivated in this implementation, so that power of the terminal can be further saved.

For example, the secondary carriers in step 310 include all secondary carriers that do not include the default BWP, and there are one or more secondary carriers. Optionally, the secondary carriers include an activated secondary carrier in all the secondary carriers that do not include the default BWP. It may be understood that the default BWP may be included in a secondary carrier, or may be included in a primary carrier. The default BWP is included in one or more secondary carriers other than the foregoing to-be-deactivated secondary carrier. In addition, it may be understood that all the secondary carriers that do not include the default BWP are a subset of the secondary carriers configured by the network device for the terminal. In this example implementation, as many secondary carriers as possible can be deactivated while low signaling overheads are maintained, thereby saving more power.

Figures 1, 8A:
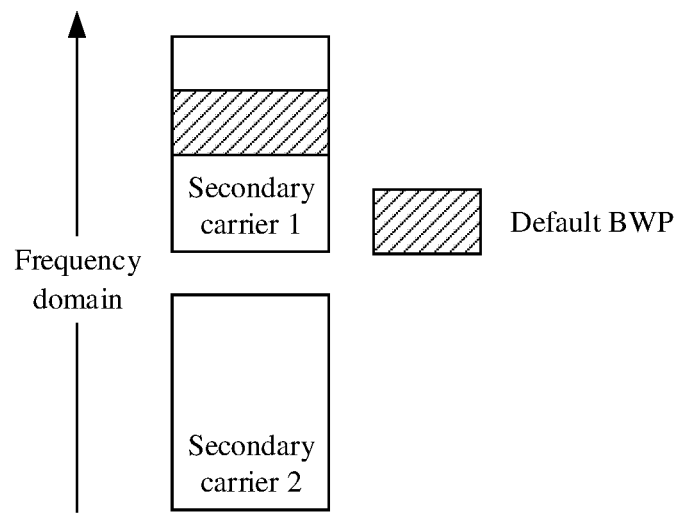
Figures 2, 8A:
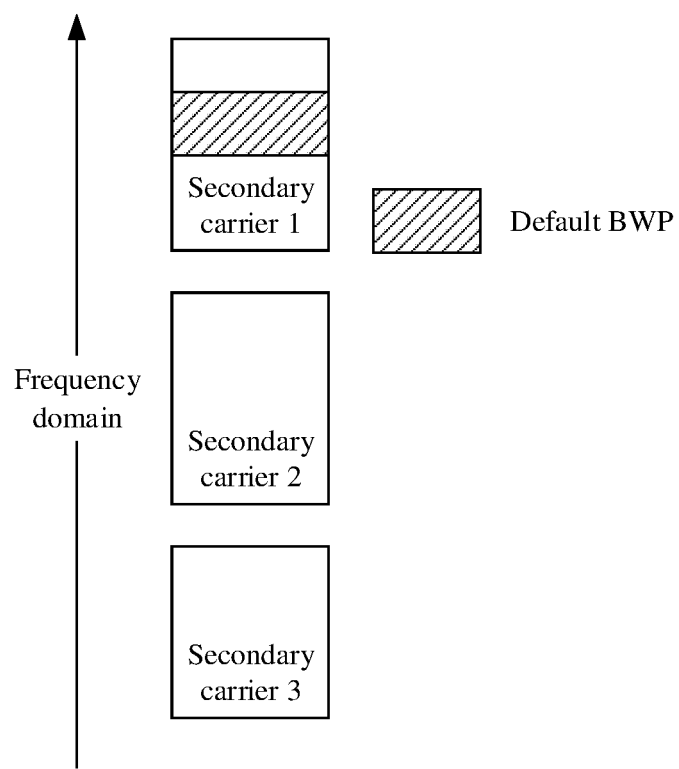
Figures 3, 8A:
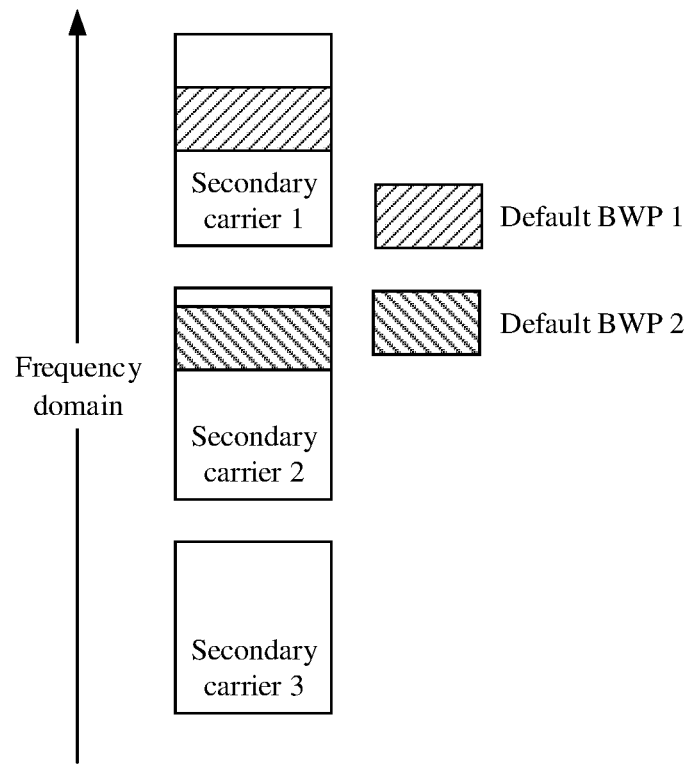

FIG. 8A-1 shows an example in which there are two secondary carriers (a secondary carrier 1 and a secondary carrier 2), the secondary carrier 1 includes the default BWP, and the first information in step 300 indicates the default BWP. In step 310, the terminal deactivates all secondary carriers (namely, the secondary carrier 2) that do not include the default BWP in the two secondary carriers. Optionally, the terminal may further determine, based on whether the secondary carrier 2 has been activated, whether to deactivate the secondary carrier 2. For example, if the secondary carrier 2 has been activated, the terminal deactivates the secondary carrier 2.

FIG. 8A-2 shows an example in which there are three secondary carriers (a secondary carrier 1, a secondary carrier 2, and a secondary carrier 3), the secondary carrier 1 includes the default BWP, and the first information in step 300 indicates the default BWP. In step 310, the terminal deactivates all secondary carriers (namely, the secondary carrier 2 and the secondary carrier 3) that do not include the default BWP in the three secondary carriers. Optionally, the terminal may further determine, based on whether the secondary carrier 2 and the secondary carrier 3 have been activated, whether to deactivate the secondary carrier 2 and the secondary carrier 3. For example, if the secondary carrier 2 has been activated and the secondary carrier 3 is not activated, the terminal deactivates the secondary carrier 2. For another example, if the secondary carrier 2 is not activated and the secondary carrier 3 has been activated, the terminal deactivates the secondary carrier 3. For still another example, if both the secondary carrier 2 and the secondary carrier 3 have been activated, the terminal deactivates the secondary carrier 2 and the secondary carrier 3.

Figures 1, 8B:
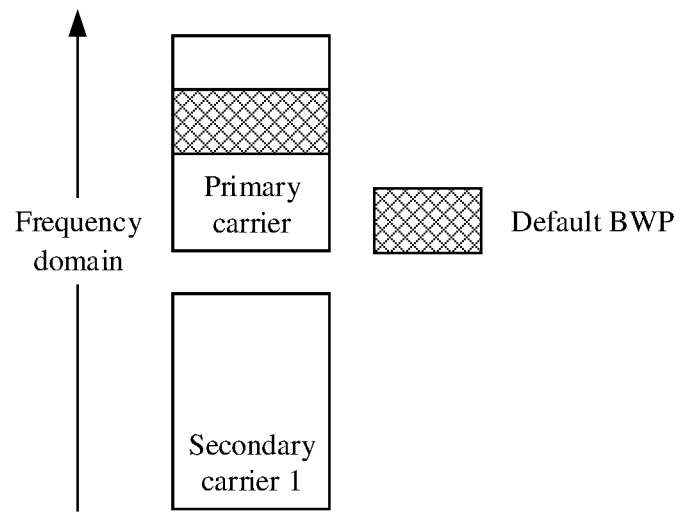
Figures 2, 8B:
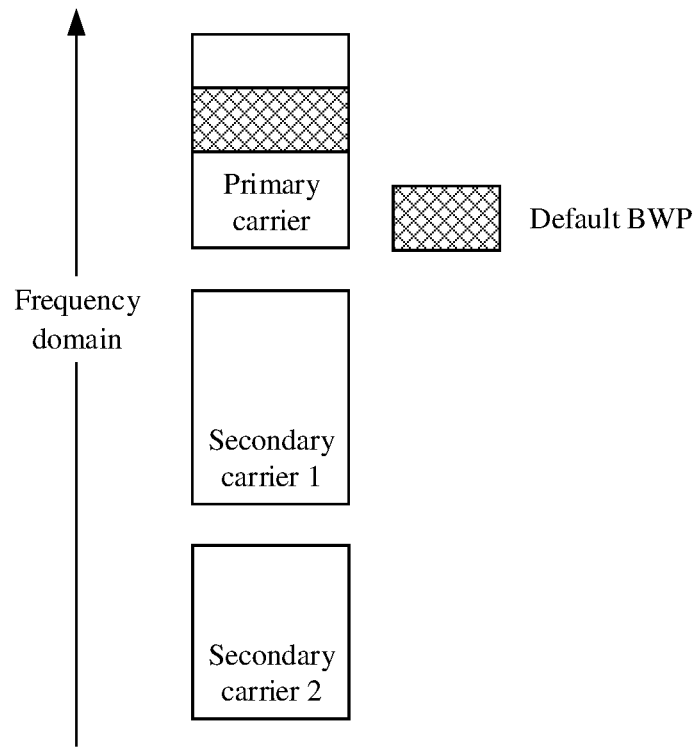

FIG. 8B-1 shows an example in which there is one primary carrier and one secondary carrier (a secondary carrier 1), the primary carrier includes the default BWP, and the first information in step 300 indicates the default BWP. In step 310, the terminal deactivates all secondary carriers (namely, the secondary carrier 1) that do not include the default BWP in the one secondary carrier. Optionally, the terminal may further determine, based on whether the secondary carrier 1 has been activated, whether to deactivate the secondary carrier 1. For example, if the secondary carrier 1 has been activated, the terminal deactivates the secondary carrier 1.

FIG. 8B-2 shows an example in which there is one primary carrier and two secondary carriers (a secondary carrier 1 and a secondary carrier 2), the primary carrier includes the default BWP, and the first information in step 300 indicates the default BWP. In step 310, the terminal deactivates all secondary carriers (namely, the secondary carrier 1 and the secondary carrier 2) that do not include the default BWP in the two secondary carriers. Optionally, the terminal may further determine, based on whether the secondary carrier 1 and the secondary carrier 2 have been activated, whether to deactivate the secondary carrier 1 and the secondary carrier 2. For example, if the secondary carrier 1 has been activated and the secondary carrier 2 is not activated, the terminal deactivates the secondary carrier 1. For another example, if the secondary carrier 1 is not activated and the secondary carrier 2 has been activated, the terminal deactivates the secondary carrier 2. For still another example, if both the secondary carrier 1 and the secondary carrier 2 have been activated, the terminal deactivates the secondary carrier 1 and the secondary carrier 2.

For example, the secondary carriers in step 310 include only some secondary carriers that do not include the default BWP, and there are one or more secondary carriers. It may be understood that the default BWP may be included in a secondary carrier, or may be included in a primary carrier. The default BWP is included in one or more secondary carriers other than the foregoing to-be-deactivated secondary carrier. In addition, it may be understood that the some secondary carriers that do not include the default BWP are a subset of the secondary carriers configured by the network device for the terminal. For a method for determining, by the terminal, which secondary carrier or which secondary carriers in the some secondary carriers that do not include the default BWP are to be deactivated, refer to the method described in FIG. 5 or FIG. 7. Details are not described herein again. According to this example implementation, a proper quantity of secondary carriers may be deactivated while low signaling overheads are maintained, so that a system performance requirement is met while power is saved.

FIG. 8A-2 shows an example in which there are three secondary carriers (a secondary carrier 1, a secondary carrier 2, and a secondary carrier 3), the secondary carrier 1 includes the default BWP, and the first information in step 300 indicates the default BWP. In step 310, the terminal deactivates some secondary carriers (namely, the secondary carrier 2 or the secondary carrier 3) that do not include the default BWP in the three secondary carriers. For a method for determining, by the terminal, whether to deactivate the secondary carrier 2 or deactivate the secondary carrier 3, refer to the method described in FIG. 5 or FIG. 7. Details are not described herein again.

FIG. 8B-2 shows an example in which there is one primary carrier and two secondary carriers (a secondary carrier 1 and a secondary carrier 2), the primary carrier includes the default BWP, and the first information in step 300 indicates the default BWP. In step 310, the terminal deactivates some secondary carriers (namely, the secondary carrier 1 or the secondary carrier 2) that do not include the default BWP in the two secondary carriers. For a method for determining, by the terminal, whether to deactivate the secondary carrier 1 or deactivate the secondary carrier 2, refer to the method described in FIG. 5 or FIG. 7. Details are not described herein again.

In another possible implementation of the embodiment of this application shown in FIG. 3, the terminal receives second information, where the second information is used to indicate the terminal to deactivate the secondary carrier based on the default BWP. The second information may be understood as a switch for enabling or disabling a function of deactivating the secondary carrier based on the default BWP. For descriptions of deactivating the secondary carrier based on the default BWP, refer to the foregoing descriptions of FIG. 3, FIG. 4, FIG. 5, or FIG. 7. Details are not described herein again. According to this implementation, enabling and disabling of the function of deactivating the secondary carrier based on the default BWP can be controlled based on a power saving requirement and a performance requirement, so that both power saving and system performance are considered.

In a possible implementation method of the second information, the second information is included in physical layer control information (for example, DCI) from the network device. Optionally, the second information is included in some fields in the DCI received from the network device, and when values of the some fields in DCI received by the terminal from the network device are default values, the terminal deactivates the secondary carrier based on the default BWP. Further, optionally, the second information includes one or more of frequency domain resource allocation information, hybrid automatic repeat request (HARQ) process identification information, new data indication information, redundancy version information, physical uplink control channel (PUCCH) transmit power control command information, or modulation and coding scheme information in the DCI from the network device. The terminal deactivates the secondary carrier based on the default BWP when values of one or more of the frequency domain resource allocation information, the HARQ process identification information, the new data indication information, the redundancy version information, the PUCCH transmit power control command information, or the modulation and coding scheme information in the DCI from the network device are default values. In this implementation, an existing field in the physical layer control information may be used to control enabling and disabling of the function of deactivating the secondary carrier based on the default BWP, and a new field does not need to be added to the physical layer control information, thereby reducing signaling overheads.

For example, the second information is included in the frequency domain resource allocation information, and when a value of the frequency domain resource allocation information received by the terminal is a default value, the terminal deactivates the secondary carrier based on the default BWP. It may be understood that, in this application, that the value of the frequency domain resource allocation information is a default value may be understood as: values of all bits in the frequency domain resource allocation information are default values, or may be understood as: values of some bits in the frequency domain resource allocation information are default values.

For example, the second information is included in the HARQ process identification information, and when a value of the HARQ process identification information received by the terminal is a default value, the terminal deactivates the secondary carrier based on the default BWP. It may be understood that, in this application, that the value of the HARQ process identification information is a default value may be understood as: values of all bits in the HARQ process identification information are default values, or may be understood as: values of some bits in the HARQ process identification information are default values.

For example, the second information is included in the new data indication information, and when a value of the new data indication information received by the terminal is a default value, the terminal deactivates the secondary carrier based on the default BWP. It may be understood that, in this application, that the value of the new data indication information is a default value may be understood as: values of all bits in the new data indication information are default values, or may be understood as: values of some bits in the new data indication information are default values.

For example, the second information is included in the redundancy version information, and when a value of the redundancy version information received by the terminal is a default value, the terminal deactivates the secondary carrier based on the default BWP. It may be understood that, in this application, that the value of the redundancy version information is a default value may be understood as: values of all bits in the redundancy version information are default values, or may be understood as: values of some bits in the redundancy version information are default values.

For example, the second information is included in the PUCCH transmit power control command information, and when a value of the PUCCH transmit power control command information received by the terminal is a default value, the terminal deactivates the secondary carrier based on the default BWP. It may be understood that, that the value of the PUCCH transmit power control command information is the default value may be understood as: values of all bits in the PUCCH transmit power control command information are default values, or may be understood as: values of some bits in the PUCCH transmit power control command information are default values.

For example, the second information is included in the modulation and coding scheme information, and when a value of the modulation and coding scheme information received by the terminal is a default value, the terminal deactivates the secondary carrier based on the default BWP. It may be understood that, in this application, that the value of the modulation and coding scheme information is a default value may be understood as: values of all bits in the modulation and coding scheme information are default values, or may be understood as: values of some bits in the modulation and coding scheme information are default values.

The foregoing describes a carrying manner of the second information only by using an example in which the second information is included in one of the frequency domain resource allocation information, the HARQ process identification information, the new data indication information, the redundancy version information, the PUCCH transmit power control command information, or the modulation and coding scheme information. It may be understood that the second information may further be included in a plurality of types of information in the frequency domain resource allocation information, the HARQ process identification information, the new data indication information, the redundancy version information, the PUCCH transmit power control command information, or the modulation and coding scheme information.

For example, the second information is included in the frequency domain resource allocation information and the PUCCH transmit power control command information, and when values of the frequency domain resource allocation information and the PUCCH transmit power control command information received by the terminal are default values, the terminal deactivates the secondary carrier based on the default BWP. It may be understood that a default value of the value of the frequency domain resource allocation information may be the same as or different from a default value of the value of the PUCCH transmit power control command information. This is not limited in this application.

For example, the second information is included in the frequency domain resource allocation information and the HARQ process identification information, and when values of the frequency domain resource allocation information and the HARQ process identification information received by the terminal are default values, the terminal deactivates the secondary carrier based on the default BWP. It may be understood that a default value of the value of the frequency domain resource allocation information may be the same as or different from a default value of the value of the HARQ process identification information. This is not limited in this application.

For example, the second information is included in the modulation and coding scheme information and the HARQ process identification information, and when values of the modulation and coding scheme information and the HARQ process identification information received by the terminal are default values, the terminal deactivates the secondary carrier based on the default BWP. It may be understood that a default value of the value of the modulation and coding scheme information may be the same as or different from a default value of the value of the HARQ process identification information. This is not limited in this application.

For example, the second information is included in the modulation and coding scheme information and the PUCCH transmit power control command information, and when values of the modulation and coding scheme information and the PUCCH transmit power control command information received by the terminal are default values, the terminal deactivates the secondary carrier based on the default BWP. It may be understood that a default value of the value of the modulation and coding scheme information may be the same as or different from a default value of the value of the PUCCH transmit power control command information. This is not limited in this application.

For example, the second information is included in the modulation and coding scheme information and the frequency domain resource allocation information, and when values of the modulation and coding scheme information and the frequency domain resource allocation information received by the terminal are default values, the terminal deactivates the secondary carrier based on the default BWP. It may be understood that a default value of the value of the modulation and coding scheme information may be the same as or different from a default value of the value of the frequency domain resource allocation information. This is not limited in this application.

The foregoing merely uses an example in which the second information is included in the frequency domain resource allocation information and the PUCCH transmit power control command information, the frequency domain resource allocation information and the HARQ process identification information, the modulation and coding scheme information and the HARQ process identification information, the modulation and coding scheme information and the PUCCH transmit power control command information, or the modulation and coding scheme information and the frequency domain resource allocation information to describe a manner of carrying the second information. It may be understood that the second information may further be included in a plurality of other types of information in the frequency domain resource allocation information, the HARQ process identification information, the new data indication information, the redundancy version information, the PUCCH transmit power control command information, or the modulation and coding scheme information. This is not limited in this embodiment of this application.

In another possible implementation method of the second information, the second information is included in higher layer signaling (for example, RRC signaling or a media access control control element (MAC CE)) from the network device. For example, if the terminal receives the higher layer signaling, the terminal deactivates the secondary carrier based on the default BWP; or if the terminal does not receive the higher layer signaling, the terminal deactivates the secondary carrier based on the default BWP. For another example, if a field in the higher layer signaling received by the terminal indicates a predefined value, the terminal deactivates the secondary carrier based on the default BWP; or if a field in the higher layer signaling received by the terminal indicates a non-predefined value, the terminal deactivates the secondary carrier based on the default BWP. In this implementation, the higher layer signaling may be used to control enabling and disabling of the function of deactivating the secondary carrier based on the default BWP, and physical layer control information does not need to be introduced, thereby reducing physical layer signaling overheads.

In another possible implementation of the embodiment of this application shown in FIG. 3, the terminal receives second information, where the second information is used to indicate to deactivate the secondary carrier based on the default BWP and activate the default BWP. The second information may be understood as a switch for enabling or disabling a function of deactivating the secondary carrier based on the default BWP and activating the default BWP. It may be understood that, in this implementation, the secondary carrier (that is, the to-be-deactivated secondary carrier) does not include the default BWP. For descriptions of deactivating the secondary carrier based on the default BWP, refer to the foregoing descriptions of FIG. 3, FIG. 4, FIG. 5, or FIG. 7. Details are not described herein again. For descriptions of indicating, by the second information, the terminal to deactivate the secondary carrier based on the default BWP and activate the default BWP, refer to the foregoing descriptions of indicating, by the second information, the terminal to deactivate the secondary carrier based on the default BWP. Details are not described herein again.

In another possible implementation of the embodiment of this application shown in FIG. 3, the secondary carrier (that is, the to-be-deactivated secondary carrier) includes the default BWP. It may be understood that, in a possible scenario, when the terminal is indicated to deactivate the default BWP, the secondary carrier including the default BWP may also be deactivated in this implementation, so that the terminal does not need to be notified, by using another rule or other information, of a secondary carrier or secondary carriers that need to be deactivated. This simplifies a system design and reduces signaling overheads.

FIG. 8A-2 shows an example in which there are three secondary carriers (a secondary carrier 1, a secondary carrier 2, and a secondary carrier 3), the secondary carrier 1 includes the default BWP, and the first information in step 300 indicates the default BWP. In step 310, the terminal deactivates a secondary carrier (namely, the secondary carrier 1) that includes the default BWP in the three secondary carriers.

FIG. 8A-3 shows an example in which there are three secondary carriers (a secondary carrier 1, a secondary carrier 2, and a secondary carrier 3), the secondary carrier 1 includes a default BWP 1, the secondary carrier 2 includes a default BWP 2, and the first information in step 300 indicates the default BWP 1 and the default BWP 2. In step 310, the terminal deactivates a secondary carrier (namely, the secondary carrier 1) that includes the default BWP 1 and a secondary carrier (namely, the secondary carrier 2) that includes the default BWP 2 in the three secondary carriers.

In the foregoing implementation in which the secondary carrier (that is, the to-be-deactivated secondary carrier) includes the default BWP, optionally, the terminal receives the second information, where the second information is used to indicate the terminal to deactivate the secondary carrier based on the default BWP or activate the default BWP. For descriptions of deactivating the secondary carrier based on the default BWP, refer to the foregoing descriptions of FIG. 3, FIG. 4, FIG. 5, or FIG. 7. Details are not described herein again. According to this implementation, the secondary carrier may be deactivated based on the default BWP or the default BWP may be activated based on a power saving requirement and a performance requirement, so that both power saving and system performance are considered.

In a possible implementation method of the second information, the second information is included in physical layer control information (for example, DCI) from the network device. Optionally, the second information is included in some fields in the DCI from the network device. When values of the some fields in the DCI received by the terminal from the network device are default values, the terminal deactivates the secondary carrier based on the default BWP. When values of the some fields in the DCI received by the terminal from the network device are non-default values, the terminal activates the default BWP. Further, optionally, the second information is included in one or more of frequency domain resource allocation information, HARQ process identification information, new data indication information, redundancy version information, PUCCH transmit power control command information, or modulation and coding scheme information in the DCI from the network device. The terminal deactivates the secondary carrier based on the default BWP when values of one or more of the frequency domain resource allocation information, the HARQ process identification information, the new data indication information, the redundancy version information, the PUCCH transmit power control command information, or the modulation and coding scheme information in the DCI received by the terminal from the network device are default values. The terminal activates the default BWP when values of one or more of the frequency domain resource allocation information, the HARQ process identifier information, the new data indication information, the redundancy version information, the PUCCH transmit power control command information, or the modulation and coding scheme information in the DCI received by the terminal from the network device are non-default values. In this implementation, an existing field in the physical layer control information may be used to control to deactivate the secondary carrier based on the default BWP or activate the default BWP, and a new field does not need to be added to the physical layer control information, thereby reducing signaling overheads.

For example, the second information is included in the frequency domain resource allocation information. When a value of the frequency domain resource allocation information received by the terminal is a default value, the terminal deactivates the secondary carrier based on the default BWP. When a value of the frequency domain resource allocation information received by the terminal is a non-default value, the terminal activates the default BWP. It may be understood that, in this application, that the value of the frequency domain resource allocation information is a default value may be understood as: values of all bits in the frequency domain resource allocation information are default values, or may be understood as: values of some bits in the frequency domain resource allocation information are default values. In this application, that a value of the frequency domain resource allocation information is a non-default value may be understood as: values of all bits in the frequency domain resource allocation information are non-default values, or may be understood as: values of some bits in the frequency domain resource allocation information are non-default values.

For example, the second information is included in the HARQ process identification information. When a value of the HARQ process identification information received by the terminal is a default value, the terminal deactivates the secondary carrier based on the default BWP. When a value of the HARQ process identification information received by the terminal is a non-default value, the terminal activates the default BWP. It may be understood that, in this application, that the value of the HARQ process identification information is a default value may be understood as: values of all bits in the HARQ process identification information are default values, or may be understood as: values of some bits in the HARQ process identification information are default values. In this application, that a value of the HARQ process identification information is a non-default value may be understood as: values of all bits in the HARQ process identification information are non-default values, or may be understood as: values of some bits in the HARQ process identification information are non-default values.

For example, the second information is included in the new data indication information. When a value of the new data indication information received by the terminal is a default value, the terminal deactivates the secondary carrier based on the default BWP. When a value of the new data indication information received by the terminal is a non-default value, the terminal activates the default BWP. It may be understood that, in this application, that the value of the new data indication information is a default value may be understood as: values of all bits in the new data indication information are default values, or may be understood as: values of some bits in the new data indication information are default values. In this application, that a value of the new data indication information is a non-default value may be understood as: values of all bits in the new data indication information are non-default values, or may be understood as: values of some bits in the new data indication information are non-default values.

For example, the second information is included in the redundancy version information. When a value of the redundancy version information received by the terminal is a default value, the terminal deactivates the secondary carrier based on the default BWP. When a value of the redundancy version information received by the terminal is a non-default value, the terminal activates the default BWP. It may be understood that, in this application, that the value of the redundancy version information is a default value may be understood as: values of all bits in the redundancy version information are default values, or may be understood as: values of some bits in the redundancy version information are default values. In this application, that a value of the redundancy version information is a non-default value may be understood as: values of all bits in the redundancy version information are non-default values, or may be understood as: values of some bits in the redundancy version information are non-default values.

For example, the second information is included in the PUCCH transmit power control command information. When a value of the PUCCH transmit power control command information received by the terminal is a default value, the terminal deactivates the secondary carrier based on the default BWP. When a value of the PUCCH transmit power control command information received by the terminal is a non-default value, the terminal activates the default BWP. It may be understood that, in this application, that the value of the PUCCH transmit power control command information is a default value may be understood as: values of all bits in the PUCCH transmit power control command information are default values, or may be understood as: values of some bits in the PUCCH transmit power control command information are default values. In this application, that the value of the PUCCH transmit power control command information is a non-default value may be understood as: values of all bits in the PUCCH transmit power control command information are non-default values, or may be understood as: values of some bits in the PUCCH transmit power control command information are non-default values.

For example, the second information is included in the modulation and coding scheme information. When a value of the modulation and coding scheme information received by the terminal is a default value, the terminal deactivates the secondary carrier based on the default BWP. When a value of the modulation and coding scheme information received by the terminal is a non-default value, the terminal activates the default BWP. It may be understood that, in this application, that the value of the modulation and coding scheme information is a default value may be understood as: values of all bits in the modulation and coding scheme information are default values, or may be understood as: values of some bits in the modulation and coding scheme information are default values. In this application, that a value of the modulation and coding scheme information is a non-default value may be understood as: values of all bits in the modulation and coding scheme information are non-default values, or may be understood as: values of some bits in the modulation and coding scheme information are non-default values.

The foregoing describes a carrying manner of the second information only by using an example in which the second information is included in one of the frequency domain resource allocation information, the HARQ process identification information, the new data indication information, the redundancy version information, the PUCCH transmit power control command information, or the modulation and coding scheme information. It may be understood that the second information may further be included in a plurality of types of information in the frequency domain resource allocation information, the HARQ process identification information, the new data indication information, the redundancy version information, the PUCCH transmit power control command information, or the modulation and coding scheme information.

For example, the second information is included in the frequency domain resource allocation information and the PUCCH transmit power control command information. When a value of the frequency domain resource allocation information and a value of the PUCCH transmit power control command information received by the terminal are default values, the terminal deactivates the secondary carrier based on the default BWP. When a value of the frequency domain resource allocation information and a value of the PUCCH transmit power control command information received by the terminal are non-default values, the terminal activates the default BWP.

For example, the second information is included in the frequency domain resource allocation information and the HARQ process identification information. When a value of the frequency domain resource allocation information and a value of the HARQ process identification information received by the terminal are default values, the terminal deactivates the secondary carrier based on the default BWP. When a value of the frequency domain resource allocation information and a value of the HARQ process identification information received by the terminal are non-default values, the terminal activates the default BWP.

For example, the second information is included in the modulation and coding scheme information and the HARQ process identification information. When a value of the modulation and coding scheme information and a value of the HARQ process identification information received by the terminal are default values, the terminal deactivates the secondary carrier based on the default BWP. When a value of the modulation and coding scheme information and a value of the HARQ process identification information received by the terminal are non-default values, the terminal activates the default BWP.

For example, the second information is included in the modulation and coding scheme information and the PUCCH transmit power control command information. When a value of the modulation and coding scheme information and a value of the PUCCH transmit power control command information received by the terminal are default values, the terminal deactivates the secondary carrier based on the default BWP. When a value of the modulation and coding scheme information and a value of the PUCCH transmit power control command information received by the terminal are non-default values, the terminal activates the default BWP.

For example, the second information is included in the modulation and coding scheme information and the frequency domain resource allocation information. When a value of the modulation and coding scheme information and a value of the frequency domain resource allocation information received by the terminal are default values, the terminal deactivates the secondary carrier based on the default BWP. When a value of the modulation and coding scheme information and a value of the frequency domain resource allocation information received by the terminal are non-default values, the terminal activates the default BWP.

The foregoing merely uses an example in which the second information is included in the frequency domain resource allocation information and the PUCCH transmit power control command information, the frequency domain resource allocation information and the HARQ process identification information, the modulation and coding scheme information and the HARQ process identification information, the modulation and coding scheme information and the PUCCH transmit power control command information, or the modulation and coding scheme information and the frequency domain resource allocation information to describe a manner of carrying the second information. It may be understood that the second information may further be included in a plurality of other types of information in the frequency domain resource allocation information, the HARQ process identification information, the new data indication information, the redundancy version information, the PUCCH transmit power control command information, or the modulation and coding scheme information. This is not limited in this embodiment of this application.

In another possible implementation method of the second information, the second information is included in higher layer signaling (for example, RRC signaling or a MAC CE) from the network device. For example, if the terminal receives the higher layer signaling, the terminal deactivates the secondary carrier based on the default BWP. If the terminal does not receive the higher layer signaling, the terminal activates the default BWP. For another example, if the terminal does not receive the higher layer signaling, the terminal deactivates the secondary carrier based on the default BWP. If the terminal receives the higher layer signaling, the terminal activates the default BWP. For still another example, if a field in the higher layer signaling received by the terminal indicates a first predefined value, the terminal deactivates the secondary carrier based on the default BWP. If a field in the higher layer signaling received by the terminal indicates a second predefined value, the terminal activates the default BWP. In this implementation, the higher layer signaling may be used to control enabling and disabling of the function of deactivating the secondary carrier based on the default BWP, and physical layer control information does not need to be introduced, thereby reducing physical layer signaling overheads.

In another possible implementation of the embodiment of this application shown in FIG. 3, the secondary carriers (namely, the to-be-deactivated secondary carriers) include a first part of the secondary carriers and a second part of the secondary carriers, the first part of the secondary carriers does not include the default BWP, and the second part of the secondary carriers includes the default BWP. FIG. 8A-1 shows an example in which there are two secondary carriers (a secondary carrier 1 and a secondary carrier 2), the secondary carrier 1 includes the default BWP, and the first information in step 300 indicates the default BWP. In step 310, the terminal deactivates the secondary carrier 2 (namely, the first part of the secondary carriers) that does not include the default BWP and the secondary carrier 1 (namely, the second part of the secondary carriers) that includes the default BWP. For descriptions of deactivating the first part of the secondary carriers, refer to the foregoing descriptions in which the secondary carrier (namely, the to-be-deactivated secondary carrier) does not include the default BWP. For descriptions of deactivating the second part of the secondary carriers, refer to the foregoing descriptions in which the secondary carrier (namely, the to-be-deactivated secondary carrier) includes the default BWP. Details are not described herein again.

Figure 9:
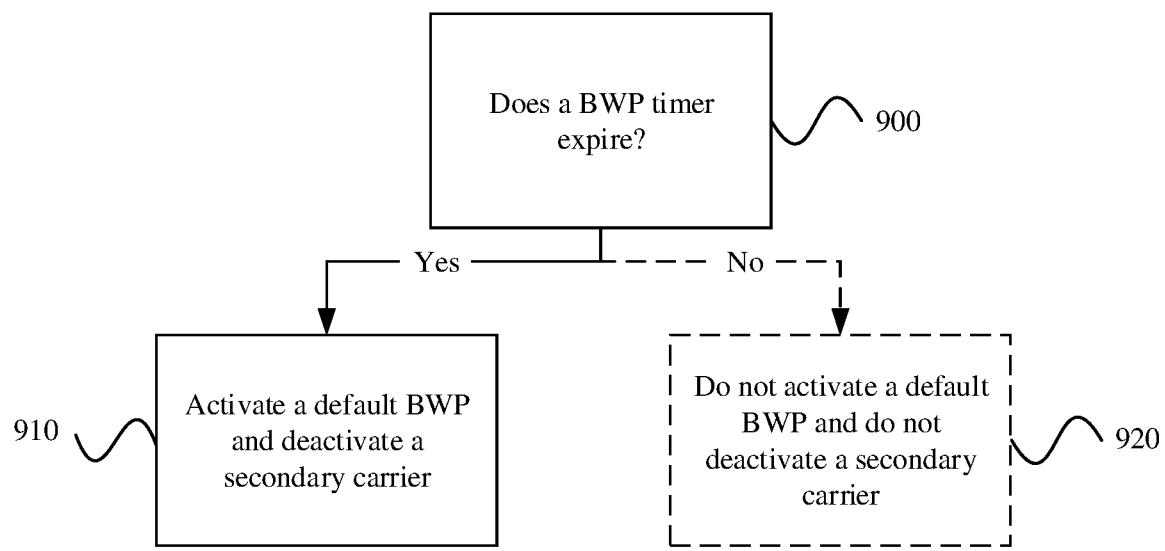
FIG. 9 is a flowchart of another method for deactivating a carrier according to an embodiment of this application.

FIG. 9 is a schematic flowchart of a method for deactivating a carrier according to an embodiment of this application. As shown in FIG. 9, the method in this embodiment may include the following steps.

Step 900: A terminal determines whether a BWP timer expires.

Step 910: When the terminal determines that the BWP timer expires, the terminal activates a default BWP and deactivates a secondary carrier. The default BWP may be a downlink BWP, or may be an uplink BWP. The default BWP may be included in a secondary carrier, or may be included in a primary carrier. There are one or more secondary carriers.

Optionally, in step 920, when the terminal determines that the BWP timer does not expire, the terminal does not activate the default BWP and does not deactivate the secondary carrier.

In this embodiment of this application, optionally, the default BWP is an inactive BWP. It may be understood that the default BWP in this embodiment of this application may be a BWP configured by a network device for the terminal. Optionally, the network device may send higher layer signaling (for example, RRC signaling), and configure the default BWP for the terminal by using the higher layer signaling. Alternatively, the default BWP in this embodiment of this application may be an initial active BWP. For example, the initial active BWP is a BWP used by the terminal for initial access.

In this embodiment of this application, the terminal maintains the BWP timer. When the BWP timer expires, the terminal activates the default BWP and deactivates the one or more secondary carriers, so that the secondary carrier is deactivated without requiring the network device to deliver signaling, thereby reducing signaling overheads.

In a possible implementation of step 910, the terminal deactivates the secondary carrier based on a relationship between the default BWP and the secondary carrier.

For example, the secondary carriers in step 910 include all secondary carriers that do not include the default BWP, and there are one or more secondary carriers. Optionally, the secondary carriers include an activated secondary carrier in all the secondary carriers that do not include the default BWP. It may be understood that the default BWP may be included in a secondary carrier, or may be included in a primary carrier. In addition, it may be understood that all the secondary carriers that do not include the default BWP are a subset of secondary carriers configured by the network device for the terminal. In this example implementation, as many secondary carriers as possible can be deactivated while low signaling overheads are maintained, thereby saving more power.

FIG. 8A-1 shows an example in which there are two secondary carriers (a secondary carrier 1 and a secondary carrier 2), the secondary carrier 1 includes the default BWP, and the BWP timer in step 900 expires. In step 910, the terminal activates the default BWP and deactivates all secondary carriers (namely, the secondary carrier 2) that do not include the default BWP in the two secondary carriers. Optionally, the terminal may further determine, based on whether the secondary carrier 2 has been activated, whether to deactivate the secondary carrier 2. For example, if the secondary carrier 2 has been activated, the terminal deactivates the secondary carrier 2.

FIG. 8A-2 shows an example in which there are three secondary carriers (a secondary carrier 1, a secondary carrier 2, and a secondary carrier 3), the secondary carrier 1 includes the default BWP, and the BWP timer in step 900 expires. In step 910, the terminal activates the default BWP and deactivates all secondary carriers (namely, the secondary carrier 2 and the secondary carrier 3) that do not include the default BWP in the three secondary carriers. Optionally, the terminal may further determine, based on whether the secondary carrier 2 and the secondary carrier 3 have been activated, whether to deactivate the secondary carrier 2 and the secondary carrier 3. For example, if the secondary carrier 2 has been activated and the secondary carrier 3 is not activated, the terminal deactivates the secondary carrier 2. For another example, if the secondary carrier 2 is not activated and the secondary carrier 3 has been activated, the terminal deactivates the secondary carrier 3. For still another example, if both the secondary carrier 2 and the secondary carrier 3 have been activated, the terminal deactivates the secondary carrier 2 and the secondary carrier 3.

FIG. 8B-1 shows an example in which there is one primary carrier and one secondary carrier (a secondary carrier 1), the primary carrier includes the default BWP, and the BWP timer in step 900 expires. In step 910, the terminal activates the default BWP and deactivates all secondary carriers (namely, the secondary carrier 1) that do not include the default BWP in the one secondary carrier. Optionally, the terminal may further determine, based on whether the secondary carrier 1 has been activated, whether to deactivate the secondary carrier 1. For example, if the secondary carrier 1 has been activated, the terminal deactivates the secondary carrier 1.

FIG. 8B-2 shows an example in which there is one primary carrier and two secondary carriers (a secondary carrier 1 and a secondary carrier 2), the primary carrier includes the default BWP, and the BWP timer in step 900 expires. In step 910, the terminal activates the default BWP and deactivates all secondary carriers (namely, the secondary carrier 1 and the secondary carrier 2) that do not include the default BWP in the two secondary carriers. Optionally, the terminal may further determine, based on whether the secondary carrier 1 and the secondary carrier 2 have been activated, whether to deactivate the secondary carrier 1 and the secondary carrier 2. For example, if the secondary carrier 1 has been activated and the secondary carrier 2 is not activated, the terminal deactivates the secondary carrier 1. For another example, if the secondary carrier 1 is not activated and the secondary carrier 2 has been activated, the terminal deactivates the secondary carrier 2. For still another example, if both the secondary carrier 1 and the secondary carrier 2 have been activated, the terminal deactivates the secondary carrier 1 and the secondary carrier 2.

For example, the secondary carriers in step 910 include only some secondary carriers that do not include the default BWP, and there are one or more secondary carriers. It may be understood that the default BWP may be included in a secondary carrier, or may be included in a primary carrier. In addition, it may be understood that the some secondary carriers that do not include the default BWP are a subset of the secondary carriers configured by the network device for the terminal. For a method for determining, by the terminal, which secondary carrier or which secondary carriers in the some secondary carriers that do not include the default BWP are to be deactivated, refer to the method described in FIG. 5 or FIG. 7. Details are not described herein again. According to this example implementation, a proper quantity of secondary carriers may be deactivated while low signaling overheads are maintained, so that a system performance requirement is met while power is saved.

FIG. 8A-2 shows an example in which there are three secondary carriers (a secondary carrier 1, a secondary carrier 2, and a secondary carrier 3), the secondary carrier 1 includes the default BWP, and the BWP timer in step 900 expires. In step 910, the terminal activates the default BWP and deactivates some secondary carriers (namely, the secondary carrier 2 or the secondary carrier 3) that do not include the default BWP in the three secondary carriers. For a method for determining, by the terminal, whether to deactivate the secondary carrier 2 or deactivate the secondary carrier 3, refer to the method described in FIG. 5 or FIG. 7. Details are not described herein again.

FIG. 8B-2 shows an example in which there is one primary carrier and two secondary carriers (a secondary carrier 1 and a secondary carrier 2), the primary carrier includes the default BWP, and the BWP timer in step 900 expires. In step 910, the terminal activates the default BWP and deactivates some secondary carriers (namely, the secondary carrier 1 or the secondary carrier 2) that do not include the default BWP in the two secondary carriers. For a method for determining, by the terminal, whether to deactivate the secondary carrier 1 or deactivate the secondary carrier 2, refer to the method described in FIG. 5 or FIG. 7. Details are not described herein again.

In another possible implementation of the embodiment of this application shown in FIG. 9, the terminal receives fourth information, where the fourth information is used to indicate the terminal to deactivate the secondary carrier when the BWP timer expires. The fourth information may be understood as a switch for deactivating the secondary carrier when the BWP timer expires. According to this implementation, enabling and disabling of a function of deactivating the secondary carrier based on whether the BWP timer expires can be controlled based on a power saving requirement and a performance requirement, so that both power saving and system performance are considered.

In a possible implementation method of the fourth information, the fourth information is included in higher layer signaling (for example, RRC signaling or a MAC CE) from the network device. For example, if the terminal receives the higher layer signaling, the terminal activates the default BWP and deactivates the secondary carrier when the BWP timer expires. Alternatively, if the terminal does not receive the higher layer signaling, the terminal activates the default BWP and deactivates the secondary carrier when the BWP timer expires. For another example, if a field in the higher layer signaling received by the terminal indicates a predefined value, the terminal activates the default BWP and deactivates the secondary carrier when the BWP timer expires; or if a field in the higher layer signaling received by the terminal indicates a non-predefined value, the terminal activates the default BWP and deactivates the secondary carrier when the BWP timer expires. In this implementation, the higher layer signaling may be used to control enabling and disabling of the function of deactivating the secondary carrier when the BWP timer expires, and physical layer control information does not need to be introduced, thereby reducing physical layer signaling overheads.

Figure 10:
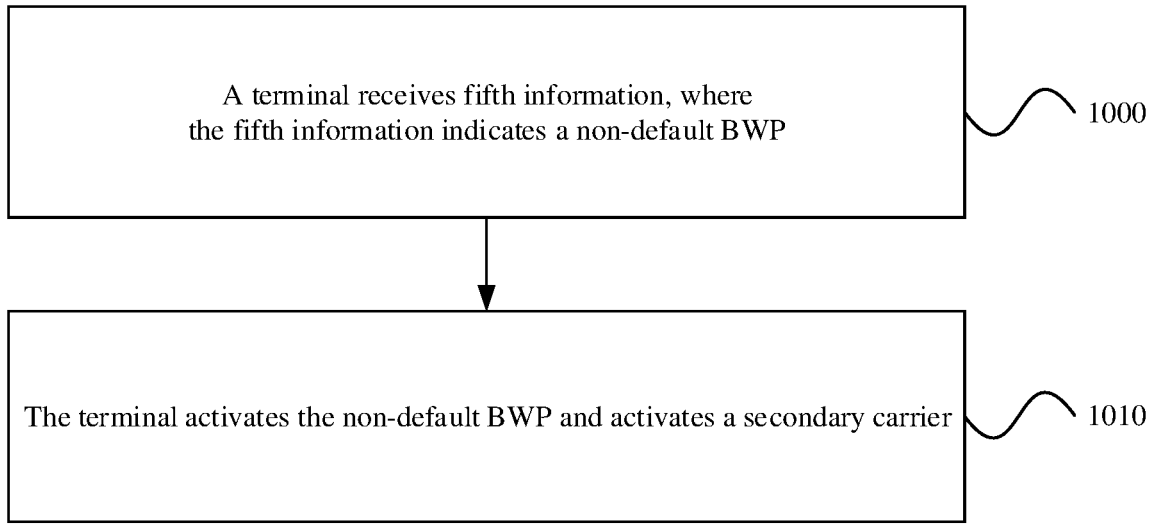
FIG. 10 is a flowchart of a method for activating a carrier according to an embodiment of this application.

FIG. 10 is a schematic flowchart of a method for activating a carrier according to an embodiment of this application. As shown in FIG. 10, the method in this embodiment may include the following parts.

Step 1000: A terminal receives fifth information, where the fifth information indicates a non-default BWP. The non-default BWP may be a downlink BWP, or may be an uplink BWP. The non-default BWP may be included in a secondary carrier, or may be included in a primary carrier. Optionally, the non-default BWP is an inactive BWP. Optionally, the fifth information is used to indicate to activate the non-default BWP (which may also be understood as: the fifth information is used to indicate to switch to the non-default BWP). Alternatively, the fifth information is used to indicate to deactivate a default BWP and activate the non-default BWP (which may also be understood as: the fifth information is used to indicate to switch from the default BWP to the non-default BWP).

Step 1010: The terminal activates the non-default BWP and activates a secondary carrier.

In a possible implementation of step 1000, the fifth information is DCI from a network device. The terminal receives the DCI, where the DCI indicates the non-default BWP. The DCI may be carried on a PDCCH. Optionally, the DCI includes a BWP indicator, and the BWP indicator indicates the non-default BWP.

In another possible implementation of step 1000, the fifth information is a BWP indicator from a network device. The terminal obtains the BWP indicator, where the BWP indicator indicates the non-default BWP. The BWP indicator may be included in DCI from the network device, and the DCI may be carried on a PDCCH.

That the fifth information in this embodiment of this application indicates the non-default BWP may be understood as: the fifth information is used to indicate the terminal to activate or use the non-default BWP.

It may be understood that the non-default BWP in this embodiment of this application is a BWP other than a default BWP, and there is one or more non-default BWPs. The default BWP may be a BWP configured by the network device for the terminal. Optionally, the network device may send higher layer signaling (for example, RRC signaling), and configure the default BWP for the terminal by using the higher layer signaling. Alternatively, the default BWP may be an initial active BWP. For example, the initial active BWP is a BWP used by the terminal for initial access.

According to this embodiment of this application, the secondary carrier is activated by using physical layer control information for activating a BWP, so that new physical layer control information does not need to be introduced for activating the secondary carrier. Therefore, relatively low signaling overheads can be maintained while the secondary carrier is quickly activated.

In step 1010 of FIG. 10, the terminal needs to determine which secondary carrier or which secondary carriers are to be activated.

Figure 11:
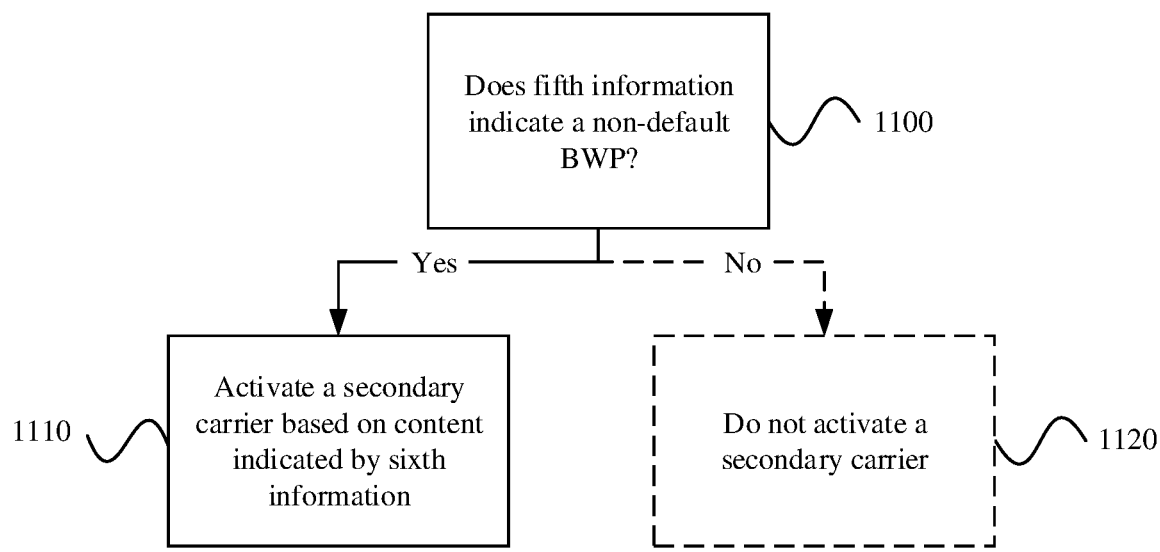
FIG. 11 is a flowchart of a method for activating a carrier based on a non-default BWP according to an embodiment of this application.

In a possible implementation of step 1010, the terminal activates the secondary carrier based on the non-default BWP and sixth information from the network device. Optionally, the sixth information may be physical layer control information (for example, DCI) from the network device. It may be understood that the sixth information is existing physical layer control information, instead of new physical layer control information introduced for activating the secondary carrier. FIG. 11 is a flowchart of this implementation. In FIG. 11, the terminal activates the secondary carrier with reference to the fifth information and the sixth information. Based on step 1100, the terminal determines, based on the received fifth information, whether the fifth information indicates the non-default BWP. When the fifth information indicates the non-default BWP, the terminal performs step 1110, to be specific, activates the one or more secondary carriers based on content indicated by the sixth information. Optionally, when the fifth information does not indicate the non-default BWP, the terminal performs step 1120, to be specific, does not activate the secondary carrier. It may be understood that the sixth information in step 1110 indicates which secondary carrier or which secondary carriers are to be activated. According to this implementation, the to-be-activated secondary carrier can be finely controlled while relatively low signaling overheads are maintained.

In a possible implementation method of step 1110, the sixth information indicates one secondary carrier, and the terminal activates the one secondary carrier based on the sixth information.

In a possible implementation method of step 1110, the sixth information indicates a plurality of secondary carriers, and the terminal activates the plurality of secondary carrier based on the sixth information.

In still another possible implementation method of step 1110, the sixth information indicates at least one of a plurality of secondary carriers, and the terminal activates the plurality of secondary carriers based on the sixth information. For example, two secondary carriers (a secondary carrier 1 and a secondary carrier 2) are used as examples. The sixth information indicates the secondary carrier 1, and the terminal activates the secondary carrier 1 and the secondary carrier 2 based on the sixth information. According to this implementation method, when a plurality of secondary carriers need to be activated, not all the plurality of secondary carriers need to be indicated, but only some (for example, one of the plurality of secondary carriers) of the plurality of secondary carriers may be indicated, to reduce indication overheads. The plurality of secondary carriers may be considered as a group of secondary carriers. Specific secondary carriers in the group of secondary carriers may be predefined, or may be configured by the network device by using higher layer signaling (for example, RRC signaling).

In a possible implementation method of the sixth information, the sixth information includes carrier indication information. For example, the carrier indication information indicates one secondary carrier, and the terminal activates the secondary carrier based on the carrier indication information. For another example, the carrier indication information indicates a plurality of secondary carriers, and the terminal activates the plurality of secondary carriers based on the carrier indication information. For still another example, the carrier indication information indicates at least one of a plurality of secondary carriers, and the terminal activates the plurality of secondary carriers based on the carrier indication information. According to the implementation method of the sixth information, existing indication information (namely, the carrier indication information) may be reused to finely control the to-be-activated secondary carrier, to maintain relatively low signaling overheads.

Optionally, the terminal may receive the carrier indication information on a primary carrier or a secondary carrier. For example, the terminal may receive the carrier indication information in self-carrier scheduling search space of the primary carrier, where the carrier indication information indicates one or more secondary carriers. For another example, the terminal may receive the carrier indication information in self-carrier scheduling search space of the secondary carrier, where the carrier indication information indicates one or more secondary carriers other than the secondary carrier.

Figure 12:
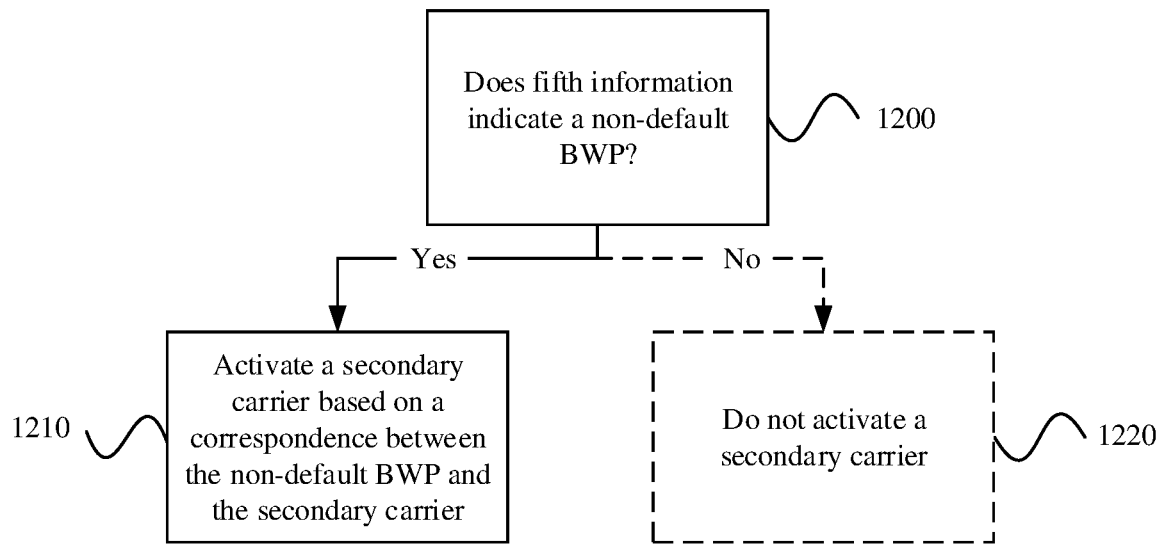
FIG. 12 is a flowchart of another method for activating a carrier based on a non-default BWP according to an embodiment of this application.

In another possible implementation of step 1010, the terminal activates the secondary carrier based on a correspondence between the non-default BWP and the secondary carrier. It may be understood that the correspondence between the non-default BWP and the secondary carrier may be predefined, or may be configured by the network device for the terminal by using higher layer signaling (for example, RRC signaling). FIG. 12 is a flowchart of this implementation. Based on step 1200, the terminal determines, based on the received fifth information, whether the fifth information indicates the non-default BWP. When the fifth information indicates the non-default BWP, the terminal performs step 1210, to be specific, activates one or more secondary carriers based on a correspondence between the non-default BWP and the one or more secondary carriers. Optionally, when the fifth information does not indicate the non-default BWP, the terminal performs step 1220, to be specific, does not activate the secondary carrier. According to this implementation, the to-be-activated secondary carrier can be controlled while relatively low signaling overheads are maintained.

For example, the correspondence between the non-default BWP and the secondary carrier meets Table 3. The terminal receives the fifth information, where the fifth information indicates the non-default BWP. The terminal activates a secondary carrier 1. Optionally, if the secondary carrier 1 may cross-carrier schedule one or more other secondary carriers, the terminal may further activate the one or more other secondary carriers. For example, the secondary carrier 1 may cross-carrier schedule a secondary carrier 2, and the terminal receives the fifth information, where the fifth information indicates the non-default BWP. In this case, the terminal activates the secondary carrier 1 and the secondary carrier 2.

TABLE 3

| Correspondence between the non-default BWP and the secondary carrier | |
|---|---|
| Non-default BWP | Secondary carrier 1 |

For example, the correspondence between the non-default BWP and the secondary carrier meets Table 4. The terminal receives the fifth information, where the fifth information indicates the non-default BWP. The terminal activates a secondary carrier 1 and a secondary carrier 2.

TABLE 4

| Correspondence between the non-default BWP and the secondary carrier | |
|---|---|
| Non-default BWP | Secondary carrier 1 and secondary carrier 2 |

Table 3 and Table 4 describe this implementation only by using an example in which the non-default BWP corresponds to one or two secondary carriers. It may be understood that, a quantity of secondary carriers corresponding to the non-default BWP is not limited in the implementation of this application.

In a possible implementation of the embodiment of this application shown in FIG. 10, the secondary carrier (namely, the to-be-activated secondary carrier) does not include the non-default BWP.

For example, the secondary carriers in step 1010 include all secondary carriers that do not include the non-default BWP, and there are one or more secondary carriers. Optionally, the secondary carriers include a non-activated secondary carrier in all the secondary carriers that do not include the non-default BWP. It may be understood that the non-default BWP may be included in a secondary carrier, or may be included in a primary carrier. The non-default BWP is included in one or more secondary carriers other than the foregoing to-be-activated secondary carrier. In addition, it may be understood that all the secondary carriers that do not include the non-default BWP are a subset of secondary carriers configured by the network device for the terminal.

In this example implementation, as many secondary carriers as possible may be activated while low signaling overheads are maintained, so that a quantity of carriers required for a system operation is met, and as many carrier resources as possible are provided.

Figures 1, 13A:
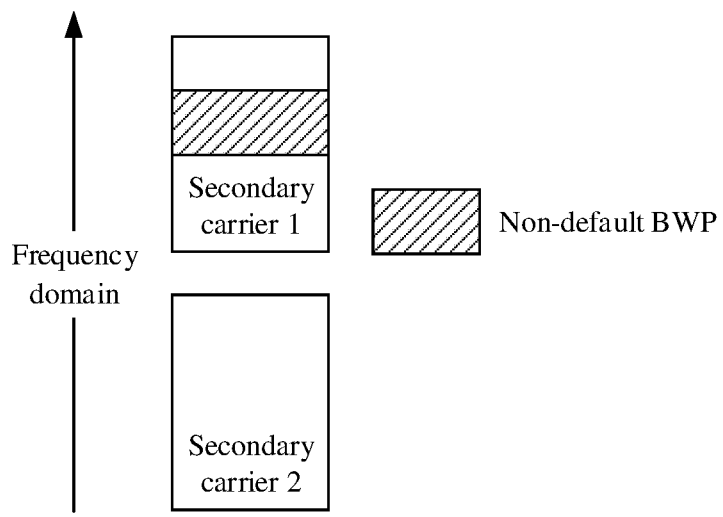
Figures 2, 13A:
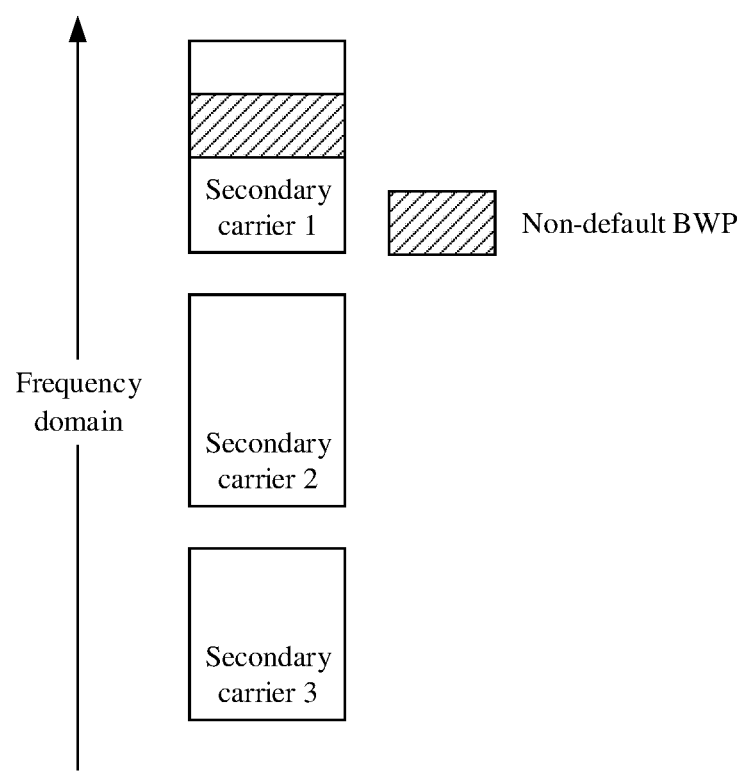
Figures 3, 13A:
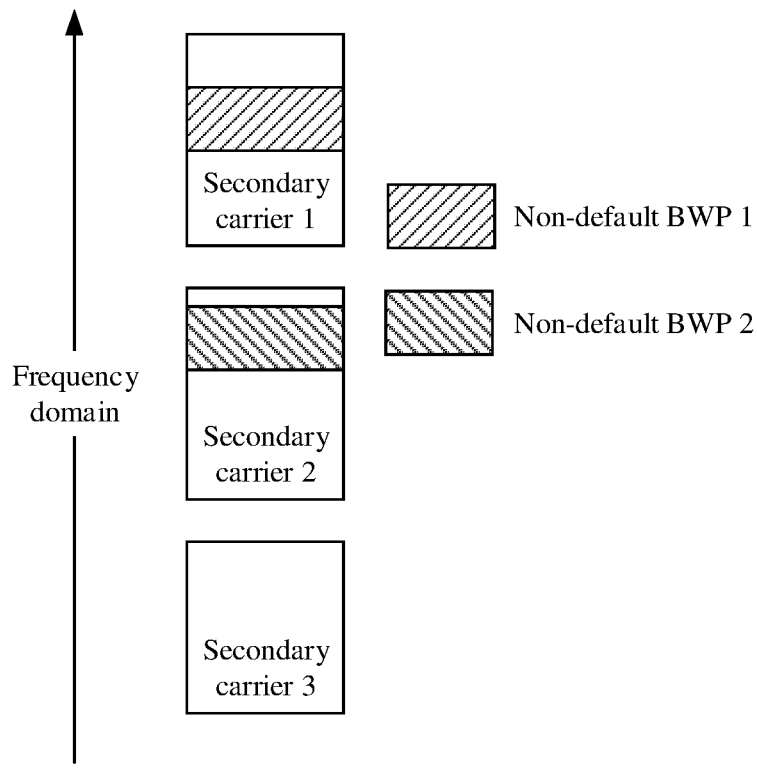

FIG. 13A-1 shows an example in which there are two secondary carriers (a secondary carrier 1 and a secondary carrier 2), the secondary carrier 1 includes the non-default BWP, and the fifth information in step 1000 indicates the non-default BWP. In step 1010, the terminal activates all secondary carriers (namely, the secondary carrier 2) that do not include the non-default BWP in the two secondary carriers. Optionally, the terminal may further determine, based on whether the secondary carrier 2 is not activated, whether to activate the secondary carrier 2. For example, if the secondary carrier 2 is not activated, the terminal activates the secondary carrier 2.

FIG. 13A-2 shows an example in which there are three secondary carriers (a secondary carrier 1, a secondary carrier 2, and a secondary carrier 3), the secondary carrier 1 includes the non-default BWP, and the fifth information in step 1000 indicates the non-default BWP. In step 1010, the terminal activates all secondary carriers (namely, the secondary carrier 2 and the secondary carrier 3) that do not include the non-default BWP in the three secondary carriers. Optionally, the terminal may further determine, based on whether the secondary carrier 2 and the secondary carrier 3 are not activated, whether to activate the secondary carrier 2 and the secondary carrier 3. For example, if the secondary carrier 2 is not activated and the secondary carrier 3 has been activated, the terminal activates the secondary carrier 2. For another example, if the secondary carrier 2 has been activated and the secondary carrier 3 is not activated, the terminal activates the secondary carrier 3. For still another example, if both the secondary carrier 2 and the secondary carrier 3 are not activated, the terminal activates the secondary carrier 2 and the secondary carrier 3.

Figures 1, 13B:
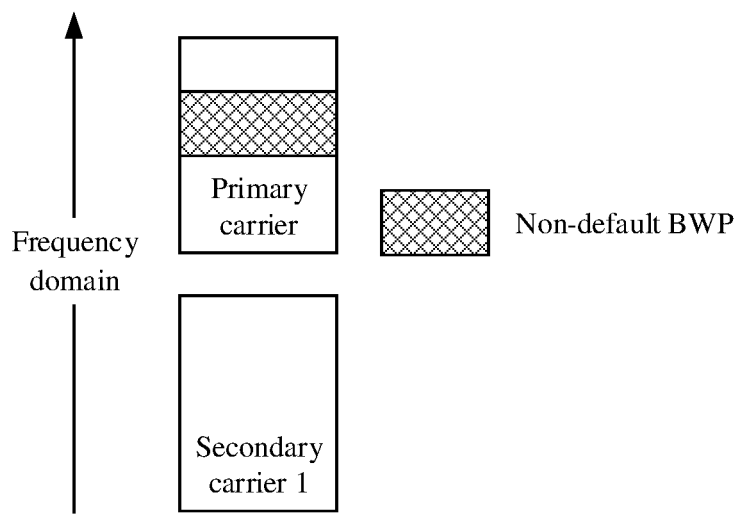
Figures 2, 13B:
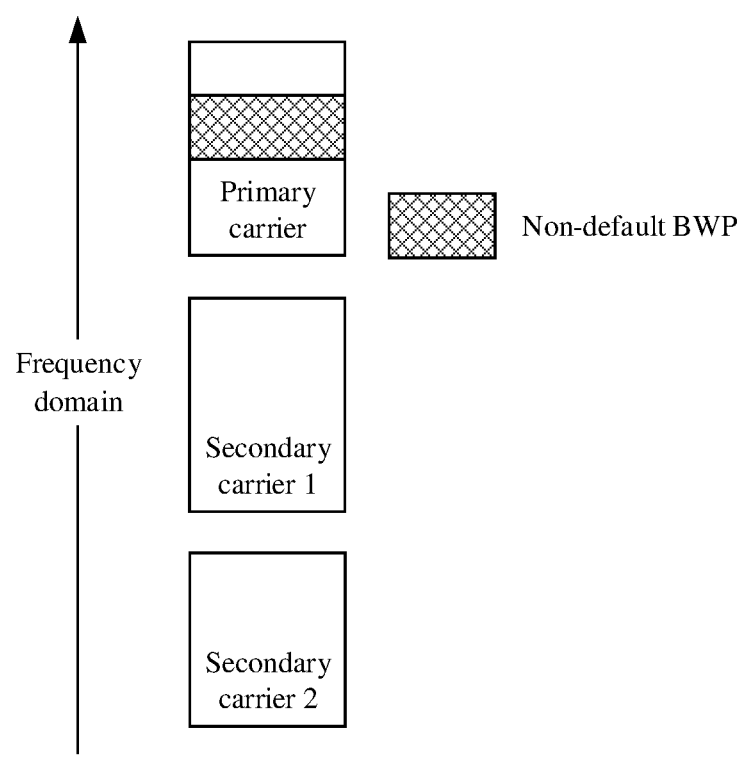

FIG. 13B-1 shows an example in which there is one primary carrier and one secondary carrier (a secondary carrier 1), the primary carrier includes the non-default BWP, and the fifth information in step 1000 indicates the non-default BWP. In step 1010, the terminal activates all secondary carriers (namely, the secondary carrier 1) that do not include the non-default BWP in the one secondary carrier. Optionally, the terminal may further determine, based on whether the secondary carrier 1 is not activated, whether to activate the secondary carrier 1. For example, if the secondary carrier 1 is not activated, the terminal activates the secondary carrier 1.

FIG. 13B-2 shows an example in which there is one primary carrier and two secondary carriers (a secondary carrier 1 and a secondary carrier 2), the primary carrier includes the non-default BWP, and the fifth information in step 1000 indicates the non-default BWP. In step 1010, the terminal activates all secondary carriers (namely, the secondary carrier 1 and the secondary carrier 2) that do not include the non-default BWP in the two secondary carriers. Optionally, the terminal may further determine, based on whether the secondary carrier 1 and the secondary carrier 2 are not activated, whether to activate the secondary carrier 1 and the secondary carrier 2. For example, if the secondary carrier 1 is not activated and the secondary carrier 2 has been activated, the terminal activates the secondary carrier 1. For another example, if the secondary carrier 1 has been activated and the secondary carrier 2 is not activated, the terminal activates the secondary carrier 2. For still another example, if both the secondary carrier 1 and the secondary carrier 2 are not activated, the terminal activates the secondary carrier 1 and the secondary carrier 2.

In another possible implementation of the embodiment of this application shown in FIG. 10, the secondary carrier (namely, the to-be-activated secondary carrier) includes the non-default BWP. In this implementation, the terminal does not need to be notified, by using another rule or other information, of a secondary carrier or secondary carriers that need to be activated, thereby simplifying a system design and reducing signaling overheads.

FIG. 13A-2 shows an example in which there are three secondary carriers (a secondary carrier 1, a secondary carrier 2, and a secondary carrier 3), the secondary carrier 1 includes the non-default BWP, and the fifth information in step 1000 indicates the non-default BWP. In step 1010, the terminal activates a secondary carrier (namely, the secondary carrier 1) that includes the non-default BWP in the three secondary carriers.

FIG. 13A-3 shows an example in which there are three secondary carriers (a secondary carrier 1, a secondary carrier 2, and a secondary carrier 3), the secondary carrier 1 includes a non-default BWP 1, the secondary carrier 2 includes a non-default BWP 2, and the fifth information in step 1000 indicates the non-default BWP 1 and the non-default BWP 2. In step 1010, the terminal activates a secondary carrier (namely, the secondary carrier 1) that includes the non-default BWP 1 and a secondary carrier (namely, the secondary carrier 2) that includes the non-default BWP 2 in the three secondary carriers.

In another possible implementation of the embodiment of this application shown in FIG. 10, the secondary carriers (namely, the to-be-activated secondary carriers) include a first part of the secondary carriers and a second part of the secondary carriers, the first part of the secondary carriers does not include the non-default BWP, and the second part of the secondary carriers includes the non-default BWP. FIG. 13A-1 shows an example in which there are two secondary carriers (a secondary carrier 1 and a secondary carrier 2), the secondary carrier 1 includes the non-default BWP, and the fifth information in step 1000 indicates the non-default BWP. In step 1010, the terminal activates the secondary carrier 2 (namely, the first part of the secondary carriers) that does not include the non-default BWP and the secondary carrier 1 (namely, the second part of the secondary carriers) that includes the non-default BWP. For descriptions of activating the first part of the secondary carriers, refer to the foregoing descriptions in which the secondary carrier (namely, the to-be-activated secondary carrier) does not include the non-default BWP. For descriptions of activating the second part of the secondary carriers, refer to the foregoing descriptions in which the secondary carrier (namely, the to-be-activated secondary carrier) includes the non-default BWP. Details are not described herein again.

In another possible implementation of the embodiment of this application shown in FIG. 10, the terminal receives seventh information, where the seventh information is used to indicate the terminal to activate the secondary carrier based on the non-default BWP. The seventh information may be understood as a switch for enabling or disabling a function of activating the secondary carrier based on the non-default BWP. For descriptions of activating the secondary carrier based on the non-default BWP, refer to the foregoing descriptions of FIG. 10, FIG. 11, or FIG. 12. For an implementation method of the seventh information, refer to the foregoing descriptions of the implementation method of the second information. Details are not described herein again. According to this implementation, enabling and disabling of the function of activating the secondary carrier based on the non-default BWP can be controlled based on power as required, so that both power saving and system performance are considered.

The correspondences shown in the foregoing tables may be configured. Values of indication information in the tables are merely examples, and may be set to other values. This is not limited in this application. When a correspondence between indication information and each parameter is configured, not all correspondences shown in the tables need to be configured. For example, in the foregoing table, correspondences shown in some rows may not be configured. For another example, proper deformations and adjustments such as splitting and combination may be performed based on the foregoing tables. Names of the parameters shown in titles of the foregoing tables may also be other names that can be understood by a communications device, and values or representation manners of the parameters may also be other values or representation manners that can be understood by the communications device. During implementation of the foregoing tables, another data structure, such as an array, a queue, a container, a stack, a linear table, a pointer, a linked list, a tree, a graph, a structure, a class, a pile, or a hash table, may be used.

"Default" in this application may be understood as "preset". A default value in this application is a predefined value, a default value, or a preset value. The non-default value in this application is a value other than the default value. It may be understood that a specific value of the default value is not limited in this application.

"Predefine" in this application may be understood as "define", "predefine", "store", "prestore", "pre-negotiate", "preconfigure", "solidify", or "pre-burn".

It may be understood that, in the accompanying drawings related to the BWP and/or the carrier (the secondary carrier or the primary carrier) in the foregoing embodiments, a size and a location of the BWP and/or the carrier are/is merely used as an example. A size and a location of the BWP and/or the carrier are not limited in this application.

It may be understood that the methods implemented by the communications device in the foregoing method embodiments may alternatively be implemented by a component (for example, an integrated circuit or a chip) that can be used in the communications device.

Corresponding to the wireless communication method provided in the foregoing method embodiments, an embodiment of this application further provides a corresponding communications apparatus (also referred to as a communications device). The communications apparatus includes a corresponding module configured to perform each part in the foregoing embodiments. The module may be software, hardware, or a combination of software and hardware.

Figure 14:
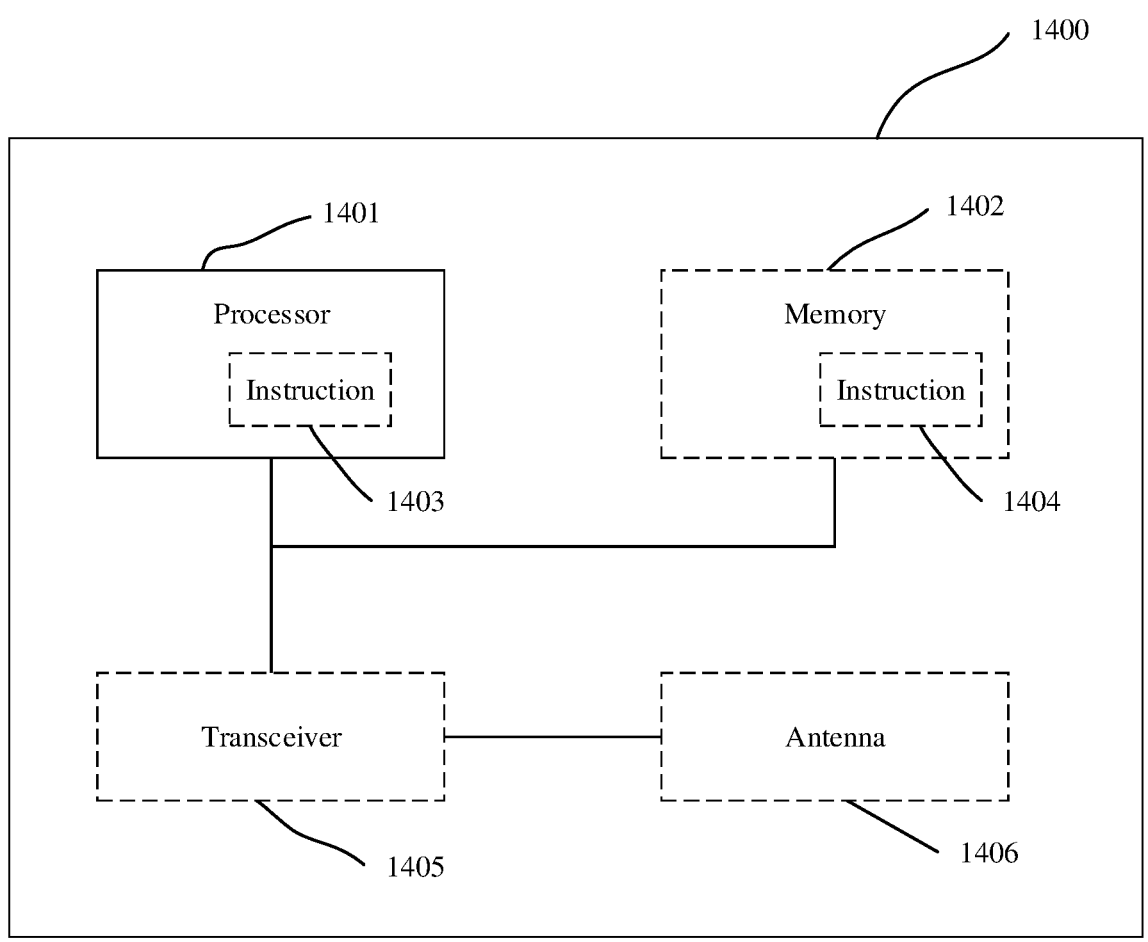
FIG. 14 is a schematic structural diagram of a communications apparatus according to an embodiment of this application.

FIG. 14 is a schematic structural diagram of a communications apparatus. The communications apparatus 1400 may be the network device 10 or 20 in FIG. 1, or may be the terminal device 11, 12, 21, or 22 in FIG. 1. The communications apparatus may be configured to implement the methods that correspond to the communications device and that are described in the foregoing method embodiments. For details, refer to the descriptions in the foregoing method embodiments.

The communications apparatus 1400 may include one or more processors 1401. The processor 1401 may also be referred to as a processing unit, and may implement a control function. The processor 1401 may be a general-purpose processor, a dedicated processor, or the like. For example, the processor 1401 may be a baseband processor or a central processing unit. The baseband processor may be configured to process a communication protocol and communication data. The central processing unit may be configured to control the communications apparatus (for example, a base station, a baseband chip, a distributed unit (DU), or a centralized unit (CU)), execute a software program, and process data of the software program.

In an optional design, the processor 1401 may also store an instruction and/or data 1403. The instruction and/or data 1403 may be run by the processor, so that the communications apparatus 1400 performs the methods that correspond to the communications device and that are described in the foregoing method embodiments.

In an optional design, the processor 1401 may include a transceiver unit configured to implement a receiving function and a sending function. For example, the transceiver unit may be a transceiver circuit or an interface. A circuit or an interface configured to implement the receiving function and a circuit or an interface configured to implement the sending function may be separated or may be integrated together.

In another possible design, the communications apparatus 1400 may include a circuit, and the circuit may implement the transmission, reception, or communication function in the foregoing method embodiments.

Optionally, the communications apparatus 1400 may include one or more memories 1402. The memory stores an instruction 1404, and the instruction may be run on the processor, so that the communications apparatus 1400 performs the method described in the foregoing embodiments. Optionally, the memory may further store data. Optionally, the processor may further store an instruction and/or data. The processor and the memory may be separately disposed, or may be integrated together. For example, various correspondences described in the foregoing method embodiments may be stored in the memory, or may be stored in the processor.

Optionally, the communications apparatus 1400 may further include a transceiver 1405 and/or an antenna 1406. The processor 1401 may be referred to as a processing unit, and controls the communications apparatus (a terminal or a network device). The transceiver 1405 may be referred to as a transceiver unit, a transceiver machine, a transceiver circuit, a transceiver, or the like, and is configured to implement transmission and reception functions of the communications apparatus.

In a possible design, a communications apparatus 1400 (for example, an integrated circuit, a wireless device, a circuit module, a network device, or a terminal) may include a processor 1401 and a transceiver 1405. The transceiver 1405 receives first information, where the first information indicates a default BWP. The processor 1401 deactivates a secondary carrier based on the default BWP.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (NMOS), a positive metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal as an example. However, a scope of the communications apparatus described in this application is not limited to the example, and the structure of the communications apparatus may not be limited by FIG. 14. The communications apparatus may be an independent device or may be a part of a relatively large device. For example, the device may be:

(1) an independent integrated circuit IC, a chip, a chip system, or a subsystem;
(2) a set including one or more ICs, where optionally, the IC set may further include a storage component configured to store data and/or an instruction;
(3) an ASIC, for example, a modem (MSM);
(4) a module that can be embedded in another device;
(5) a receiver, a terminal, an intelligent terminal, a cellular phone, a wireless device, a handheld phone, a mobile unit, a vehicle-mounted device, a network device, a cloud device, an artificial intelligence device, or the like; and
(6) other devices.

Figure 15:
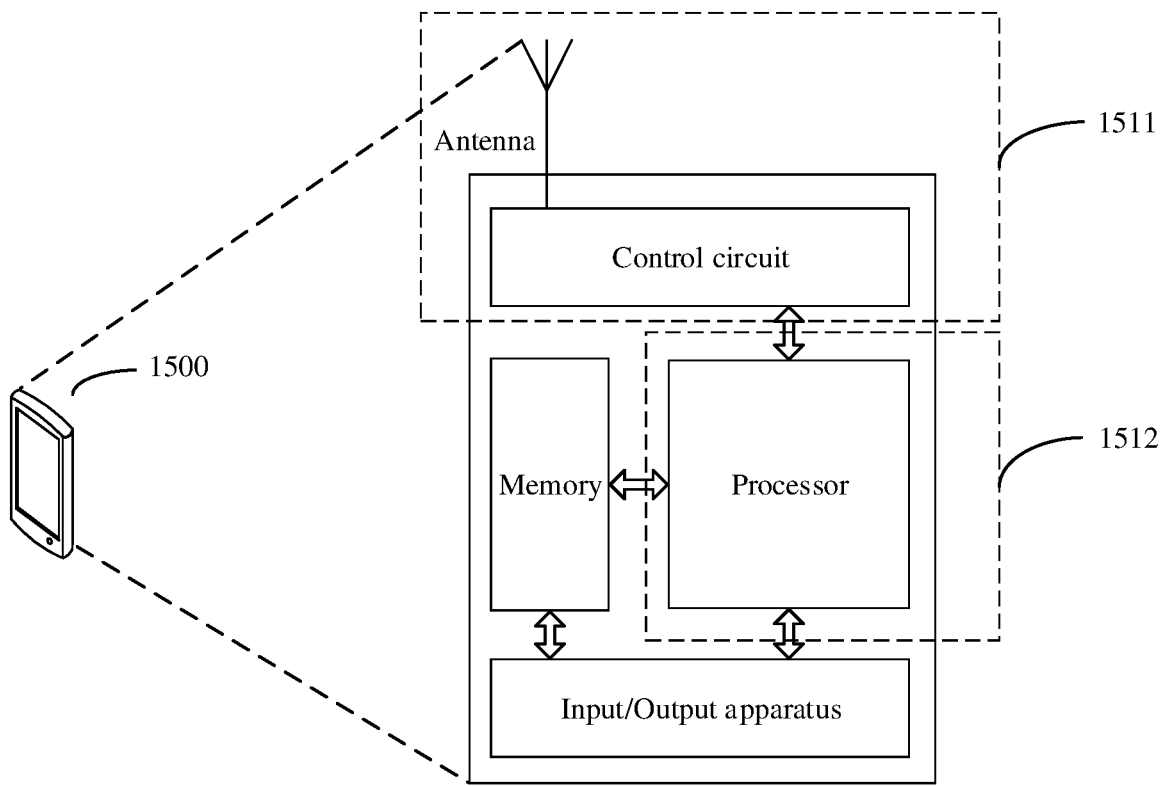
FIG. 15 is a schematic structural diagram of a terminal according to an embodiment of this application.

FIG. 15 is a schematic structural diagram of a terminal. The terminal may be used in the system shown in FIG. 1. For ease of description, FIG. 15 shows only main components of the terminal. As shown in FIG. 15, the terminal 1500 includes a processor, a memory, a control circuit, an antenna, and an input/output apparatus. The processor is mainly configured to: process a communications protocol and communications data, control the entire terminal, execute a software program, and process data of the software program. The memory is mainly configured to store a software program and data. A radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data entered by a user and output data to the user.

After user equipment is turned on, the processor may read a software program stored in a storage unit, parse and execute an instruction of the software program, and process data of the software program. When data needs to be sent wirelessly, after performing baseband processing on the to-be-sent data, the processor outputs a baseband signal to a radio frequency circuit. After processing the baseband signal, the radio frequency circuit obtains a radio frequency signal and sends the radio frequency signal to the outside through an antenna in a form of an electromagnetic wave. When data is sent to the user equipment, the radio frequency circuit receives a radio frequency signal by using the antenna, further converts the radio frequency signal into a baseband signal, and outputs the baseband signal to the processor, and the processor converts the baseband signal into data and processes the data.

A person skilled in the art may understand that for ease of description, FIG. 15 shows only one memory and one processor. An actual terminal may include a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. Functions of the baseband processor and the central processing unit are integrated into the processor in FIG. 15. A person skilled in the art may understand that the baseband processor and the central processing unit each may be an independent processor, and are interconnected by using a technology such as a bus. The person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit having transmission and reception functions may be considered as a transceiver unit 1511 of the terminal 1500, and the processor having a processing function may be considered as a processing unit 1512 of the terminal 1500. As shown in FIG. 15, the terminal 1500 includes the transceiver unit 1511 and the processing unit 1512. The transceiver unit may also be referred to as a transceiver, a transceiver machine, a transceiver apparatus, or the like. Optionally, a component that is in the transceiver unit 1511 and that is configured to implement a reception function may be considered as a receiving unit, and a component that is in the transceiver unit 1511 and that is configured to implement a transmission function may be considered as a sending unit. In other words, the transceiver unit 1511 includes the receiving unit and the sending unit. For example, the receiving unit may also be referred to as a receiver, a receiver machine, a receive circuit, or the like, and the sending unit may be referred to as a transmitter, a transmitter machine, a transmit circuit, or the like. Optionally, the receiving unit and the sending unit may be integrated into one unit, or may be a plurality of units independent of each other. The receiving unit and the sending unit may be located at one geographical location, or may be scattered at a plurality of geographical locations.

Figure 16:
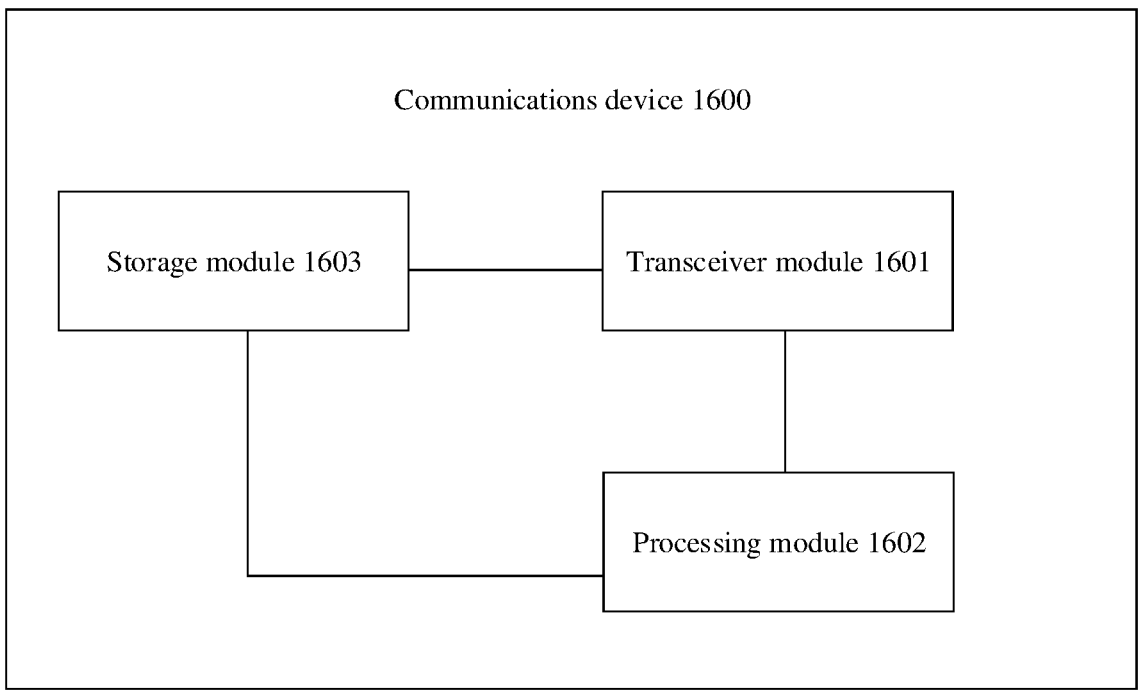
FIG. 16 is a schematic diagram of a communications device according to an embodiment of this application.

As shown in FIG. 16, another embodiment of this application provides a communications apparatus (a communications device) 1600. The communications apparatus may be a terminal (for example, a terminal in the system shown in FIG. 1) or a component (for example, an integrated circuit or a chip) of a terminal. Alternatively, the communications apparatus may be a network device (for example, the communications apparatus is a base station device that may be applied to the system in FIG. 1) or a component (for example, an integrated circuit or a chip) of a network device. Alternatively, the communications apparatus may be another communications module, configured to implement an operation corresponding to a communications device in the method embodiments of this application. The communications apparatus 1600 may include a processing module 1602 (a processing unit). Optionally, the communications apparatus 1600 may further include a transceiver module 16oi (a transceiver unit) and a storage module 1603 (a storage unit).

In a possible design, one or more modules in FIG. 16 may be implemented by one or more processors, or may be implemented by one or more processors and one or more memories, or may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated together.

The communications apparatus has a function of implementing the terminal described in the embodiments of this application. For example, the communications apparatus includes modules, units, or means that are of the terminal and that correspond to the steps performed by the terminal described in the embodiments of this application, and the functions, units, or means may be implemented by software, may be implemented by hardware, or may be implemented by hardware executing corresponding software. For details, refer to corresponding descriptions in the foregoing corresponding method embodiments.

Alternatively, the communications apparatus has a function of implementing the network device described in the embodiments of this application. For example, the communications apparatus includes modules, units, or means corresponding to the steps performed by the network device described in the embodiments of this application, and the functions, units, or means may be implemented by using software, may be implemented by hardware, or may be implemented by hardware executing corresponding software. For details, refer to corresponding descriptions in the foregoing corresponding method embodiments.

Optionally, the modules in the communications apparatus 1600 in this embodiment of this application may be configured to perform the method described in the embodiment of this application shown in FIG. 3.

In a possible implementation, the transceiver module 1601 receives first information, where the first information indicates a default BWP. The processing module 1602 deactivates a secondary carrier based on the default BWP.

According to the apparatus provided in this embodiment of this application, the secondary carrier is deactivated by using physical layer control information for activating or deactivating a BWP, so that new physical layer control information does not need to be introduced for deactivating the secondary carrier. Therefore, relatively low signaling overheads can be maintained while the secondary carrier is quickly deactivated.

Optionally, the transceiver module 16oi receives second information, where the second information is used to indicate to deactivate the secondary carrier based on the default BWP and/or activate the default BWP. Further, optionally, the second information includes one or more of frequency domain resource allocation information, HARQ process identification information, new data indication information, redundancy version information, PUCCH transmit power control command information, or modulation and coding scheme information. The processing module 1602 deactivates the secondary carrier based on the default BWP and/or activates the default BWP when values of one or more of the frequency domain resource allocation information, the HARQ process identification information, the new data indication information, the redundancy version information, the PUCCH transmit power control command information, or the modulation and coding scheme information are default values. According to this implementation, enabling and disabling of the function of deactivating the secondary carrier based on the default BWP can be controlled based on a power saving requirement and a performance requirement, so that both power saving and system performance are considered.

Optionally, the processing module 1602 deactivates the secondary carrier based on the default BWP and third information, where the third information includes one or more of the frequency domain resource allocation information, the modulation and coding scheme information, or carrier indication information, and the third information indicates the secondary carrier. Further, optionally, the third information includes information about at least one of a plurality of secondary carriers. According to this implementation, the to-be-deactivated secondary carrier can be finely controlled while relatively low signaling overheads are maintained.

Optionally, the default BWP is a BWP configured by a network device, or the default BWP is an initial active BWP.

Optionally, the default BWP is an inactive BWP.

Optionally, the modules in the communications apparatus 1600 in this embodiment of this application may be configured to perform the method described in the embodiment of this application shown in FIG. 4, FIG. 5, FIG. 7, FIG. 9, FIG. 10, FIG. 11, or FIG. 12. For descriptions of performing a method corresponding to another accompanying drawing by the modules, refer to the descriptions of performing the method corresponding to FIG. 3 by the modules. Details are not described herein again.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communications apparatus (for example, a base station, a terminal, a network entity, or a chip) may be implemented in one or more general purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that various reference numerals such as "first" and "second" in this application are merely used for differentiation for ease of description, and are not used to limit the scope of the embodiments of this application, or represent a sequence. The term "and/or" describes an association relationship between associated objects and represents that three relationships may exist. For example, A and/or B may represent the following three cases: Only A exists, both A and B exist, and only B exists. The character "/" generally represents an "or" relationship between the associated objects. "At least one" means one or more. The at least two means two or more. "At least one", "any one", or a similar expression thereof means any combination of these items, including a singular item (piece) or any combination of plural items (pieces). For example, at least one (piece, or type) of a, b, or c may indicate: a, b, c, a-b, a-c, b-c, or a-b-c, where a, b, and c may be singular or plural.

Steps of the methods or algorithms described in the embodiments of this application may be directly embedded in hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Alternatively, the memory may alternatively be integrated into a processor. The processor and the memory may be disposed in an ASIC, and the ASIC may be disposed in a terminal. Optionally, the processor and the memory may alternatively be disposed in different components of the terminal.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like. The foregoing combination shall also be included in the protection scope of the computer-readable medium.

For same or similar parts in the embodiments of this specification, refer to each other. The foregoing implementations of this application are not intended to limit the protection scope of this application.

What is claimed is:

1. An apparatus, comprising:
one or more processors; and
a non-transitory memory coupled to the one or more processors, wherein the non-transitory memory stores a program, the program including instructions that, when executed by the one or more processors, cause the apparatus to perform operations including:
receiving second information, the second information indicating to deactivate a secondary carrier based on a default bandwidth part (BWP);
receiving first information, the first information indicating the default BWP; and
in response to the receiving first information, deactivating the secondary carrier based on the default BWP.

2. The apparatus according to claim 1, wherein:
the second information comprises one or more of frequency domain resource allocation information, hybrid automatic repeat request (HARQ) process identification information, new data indication information, redundancy version information, physical uplink control channel (PUCCH) transmit power control command information, or modulation and coding scheme information; and
wherein the deactivating the secondary carrier based on the default BWP comprises:
deactivating the secondary carrier based on the default BWP when values of the one or more of the frequency domain resource allocation information, the HARQ process identification information, the new data indication information, the redundancy version information, the PUCCH transmit power control command information, or the modulation and coding scheme information are default values.

3. The apparatus according to claim 1, wherein the deactivating the secondary carrier based on the default BWP comprises:
deactivating the secondary carrier based on the default BWP and third information, wherein the third information indicates the secondary carrier, and the third information comprises one or more of frequency domain resource allocation information, modulation and coding scheme information, or carrier indication information.

4. The apparatus according to claim 3, wherein the third information comprises information about at least one carrier of a plurality of secondary carriers.

5. The apparatus according to claim 1, wherein the default BWP is configured by a network device.

6. The apparatus according to claim 1, wherein the default BWP is an initial active BWP.

7. The apparatus according to claim 1, wherein the default BWP is an inactive BWP.

8. The apparatus according to claim 1, wherein the apparatus is a terminal or a chip.

9. An apparatus, comprising:
one or more processors; and a non-transitory memory coupled to the one or more processors, wherein the non-transitory memory stores a program, the program including instructions that, when executed by the one or more processors, cause the apparatus to perform operations including:
  sending second information, the second information indicating to deactivate a secondary carrier based on a default bandwidth part (BWP); and
  sending first information, the first information indicating the default BWP to be used for deactivating the secondary carrier in response to the sending the first information.

10. The apparatus according to claim 9, wherein:
  the second information comprises one or more of frequency domain resource allocation information, hybrid automatic repeat request (HARQ) process identification information, new data indication information, redundancy version information, physical uplink control channel (PUCCH) transmit power control command information, or modulation and coding scheme information; and
  the second information indicates to deactivate the secondary carrier based on the default BWP when values of the one or more of the frequency domain resource allocation information, the HARQ process identification information, the new data indication information, the redundancy version information, the PUCCH transmit power control command information, or the modulation and coding scheme information are default values.

11. The apparatus according to claim 9, the operations further comprising:
  sending third information indicating the secondary carrier, the third information comprising one or more of frequency domain resource allocation information, modulation and coding scheme information, or carrier indication information.

12. The apparatus according to claim 11, wherein the third information comprises information about at least one carrier of a plurality of secondary carriers.

13. The apparatus according to claim 9, wherein the default BWP is configured by a network device.

14. The apparatus according to claim 9, wherein the default BWP is an initial active BWP.

15. The apparatus according to claim 9, wherein the default BWP is an inactive BWP.

16. The apparatus according to claim 9, wherein the apparatus is a network device or a chip.

17. A method, comprising:
  sending second information, the second information indicating to deactivate a secondary carrier based on a default bandwidth part (BWP); and
  sending first information, the first information indicating the default BWP to be used for deactivating the secondary carrier in response to the sending the first information.

18. The method according to claim 17, wherein the second information comprises one or more of frequency domain resource allocation information, hybrid automatic repeat request (HARQ) process identification information, new data indication information, redundancy version information, physical uplink control channel (PUCCH) transmit power control command information, or modulation and coding scheme information; and
  the second information indicates to deactivate the secondary carrier based on the default BWP when values of one or more of the frequency domain resource allocation information, the HARQ process identification information, the new data indication information, the redundancy version information, the PUCCH transmit power control command information, or the modulation and coding scheme information are default values.

19. The method according to claim 17, further comprising:
  sending third information, the third information comprises one or more of frequency domain resource allocation information, modulation and coding scheme information, or carrier indication information, and the third information indicates the secondary carrier.

20. The method according to claim 19, wherein the third information comprises information about at least one of a plurality of secondary carriers.

21. The apparatus of claim 2,
  wherein the second information is received in higher layer signaling, or the second information is received in one downlink control information (DCI); and
  wherein the secondary carrier includes a plurality of BWPs, and the deactivating the secondary carrier comprises:
    deactivating the secondary carrier including the plurality of BWPs from carrier aggregation of a primary carrier and the secondary carrier.

* * * * *